(12) United States Patent
DeSpain et al.

(10) Patent No.: US 9,420,913 B2
(45) Date of Patent: Aug. 23, 2016

(54) COLLAPSIBLE COMBUSTION CONTAINER DEVICES

(71) Applicant: QuickStove, LLC, Orem, UT (US)

(72) Inventors: Steven S. DeSpain, Moroni, UT (US); Benjamin W. Probst, Orem, UT (US); Spencer Rogers, Pleasant Grove, UT (US)

(73) Assignee: Firebox Outdoors LLP, Moroni, UT (US)

( * ) Notice: Subject to any disclaimer, the term of this patent is extended or adjusted under 35 U.S.C. 154(b) by 0 days.

(21) Appl. No.: 14/337,063

(22) Filed: Jul. 21, 2014

(65) Prior Publication Data

US 2014/0326231 A1 Nov. 6, 2014

Related U.S. Application Data

(63) Continuation-in-part of application No. 13/023,766, filed on Feb. 9, 2011.

(60) Provisional application No. 61/857,171, filed on Jul. 22, 2013, provisional application No. 61/857,594, filed on Jul. 23, 2013, provisional application No. 61/302,665, filed on Feb. 9, 2010.

(51) Int. Cl.
*A47J 37/07* (2006.01)
*B65D 6/00* (2006.01)
*A47J 33/00* (2006.01)
*F24C 1/16* (2006.01)

(52) U.S. Cl.
CPC . *A47J 33/00* (2013.01); *F24C 1/16* (2013.01)

(58) Field of Classification Search
CPC .............. A47J 33/00; F24C 7/10; F24C 1/16
USPC .................. 220/6, 4.29, 4.28; 126/9 R, 25 R
See application file for complete search history.

(56) References Cited

U.S. PATENT DOCUMENTS

| | | | |
|---|---|---|---|
| 1,212,162 A | | 1/1917 | Green |
| 1,238,142 A | * | 8/1917 | Hitchock ........................ 126/29 |
| 2,061,336 A | | 11/1936 | Stuart |
| 2,896,224 A | | 7/1959 | Landry |
| 3,384,066 A | * | 5/1968 | Tufts ..................... A47J 37/079 126/9 R |

(Continued)

FOREIGN PATENT DOCUMENTS

JP 2001-116259 A 4/2001

OTHER PUBLICATIONS

International Search Report and Written Opinion received for PCT Patent Application No. PCT/US2014/047635, mailed on Nov. 7, 2014, 14 pages.

*Primary Examiner* — Fenn Mathew
*Assistant Examiner* — Don M Anderson
(74) *Attorney, Agent, or Firm* — Brake Hughes Bellermann LLP

(57) ABSTRACT

Collapsible combustion containers are disclosed and described. Such combustion containers generally include a plurality of vertically oriented panels joined by hinges. The hinges include hinge pins that can be configured to form at least part of a base that supports the container or at least part of a heating platform above the container or both. Further, the panels can contain one or more fuel openings which allow a user to control placement of fuel in the container inserted from each opening so as to select a point inside the container where the fuel will converge and combust.

18 Claims, 27 Drawing Sheets

(56) References Cited

U.S. PATENT DOCUMENTS

| | | | |
|---|---|---|---|
| 4,455,991 A * | 6/1984 | Su | A47J 37/0763 |
| | | | 126/25 R |
| 4,455,992 A | 6/1984 | Hsiao | |
| 4,794,906 A | 1/1989 | Longley, Jr. | |
| 4,971,045 A | 11/1990 | Probst | |
| 5,503,138 A | 4/1996 | Chang | |
| 2008/0276926 A1 | 11/2008 | Chang | |
| 2009/0020109 A1 * | 1/2009 | Rheault | 126/25 R |
| 2012/0073570 A1 * | 3/2012 | Wall et al. | 126/9 R |
| 2014/0326720 A1 | 11/2014 | Probst et al. | |

* cited by examiner

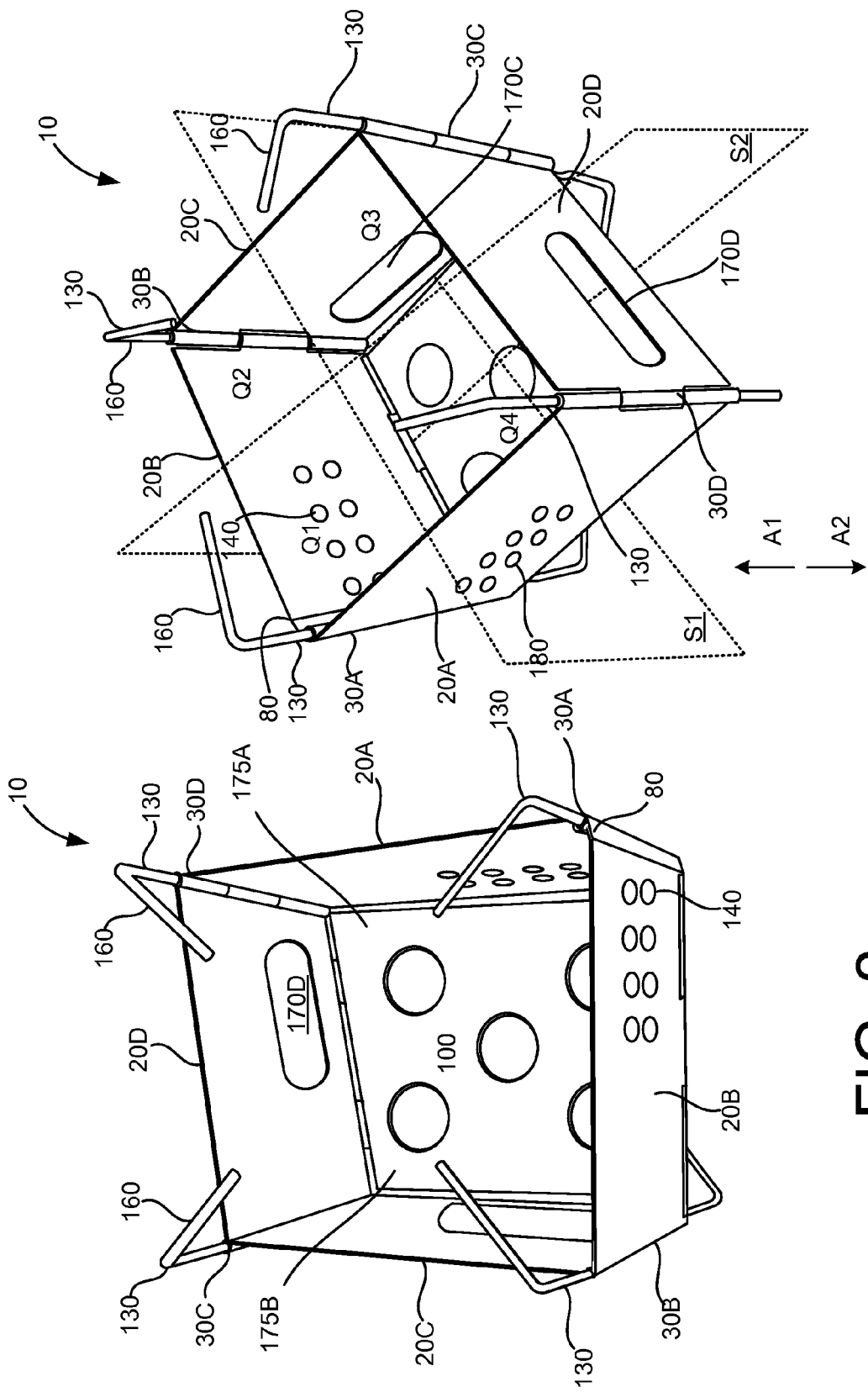

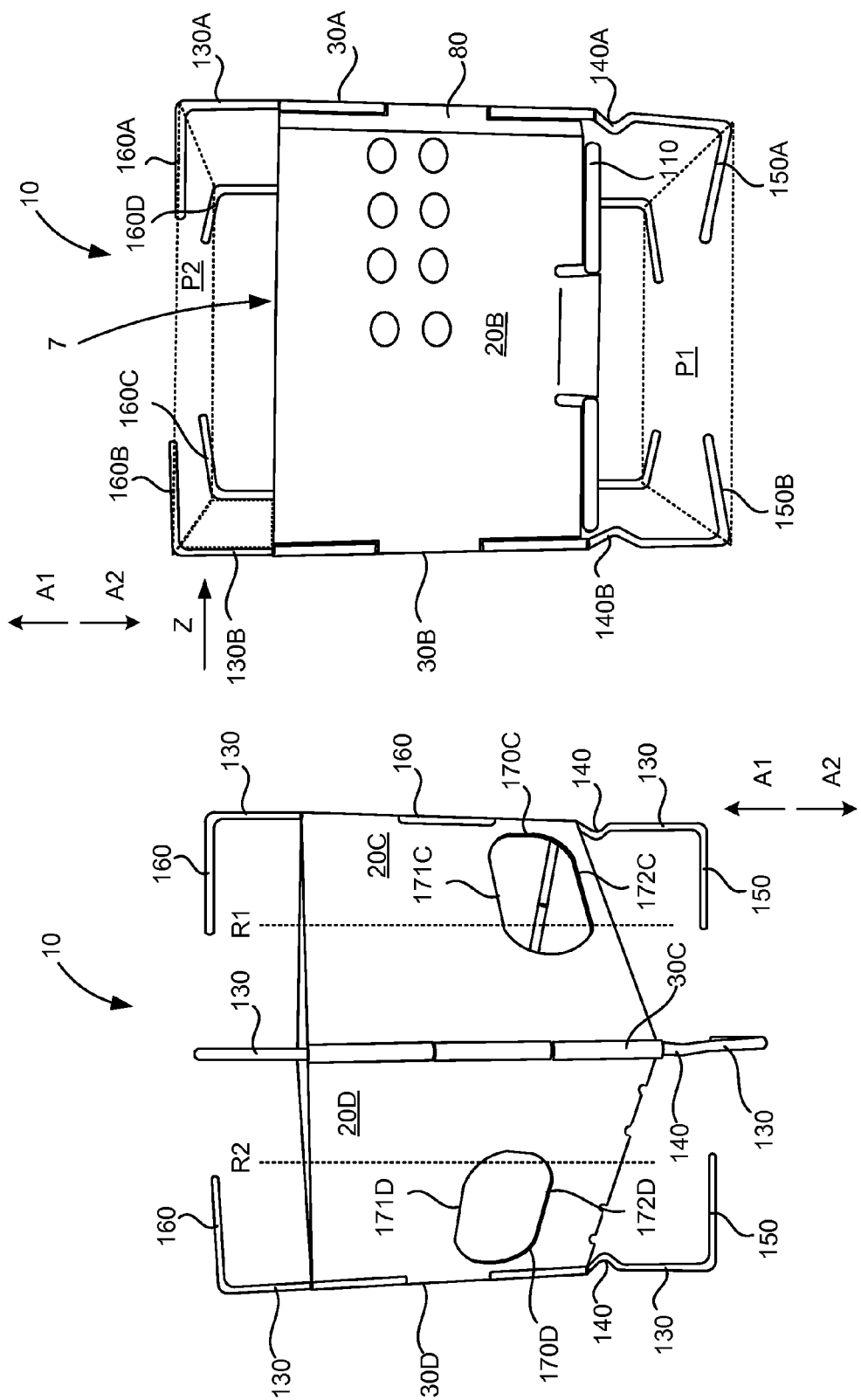

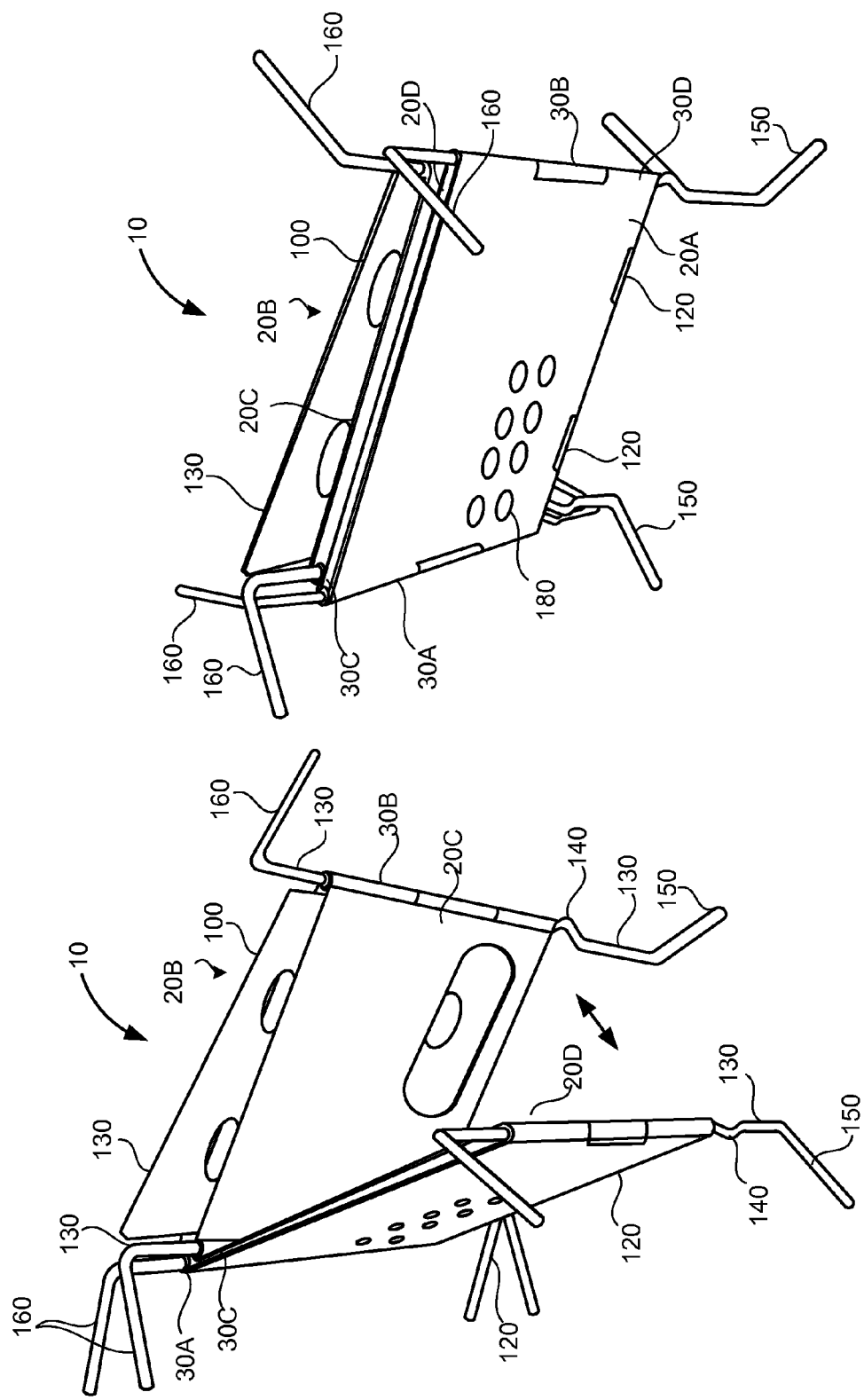

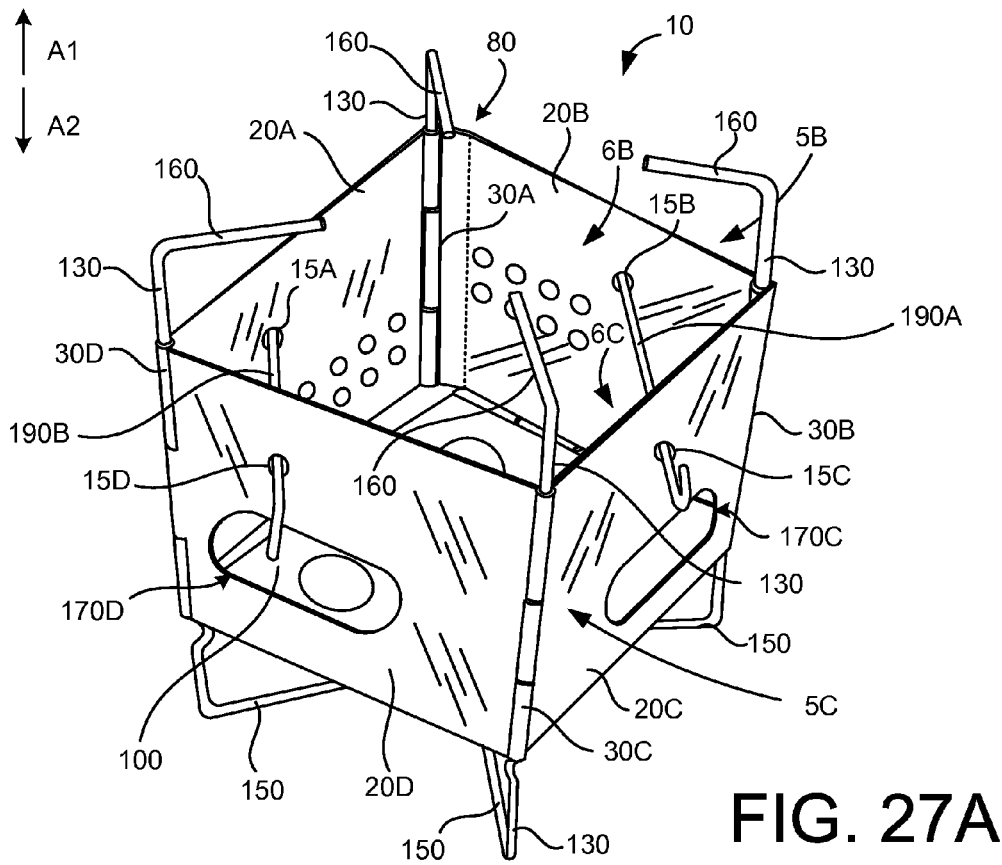
FIG. 27A
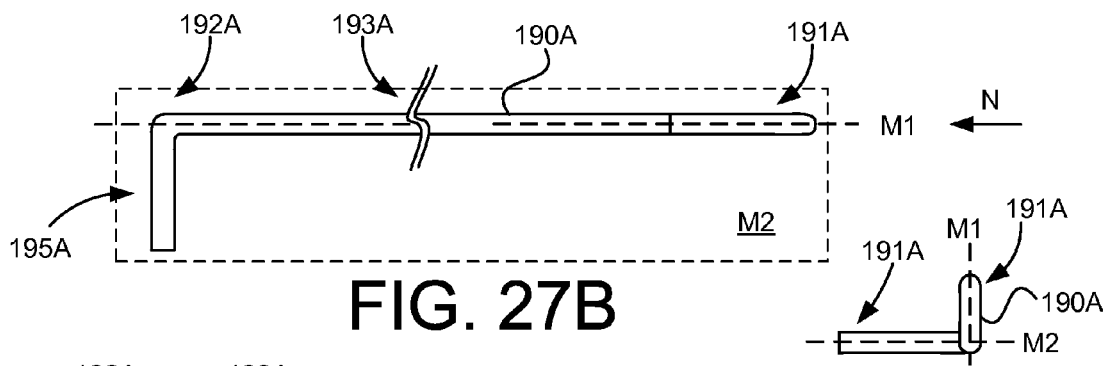
FIG. 27B
FIG. 27D
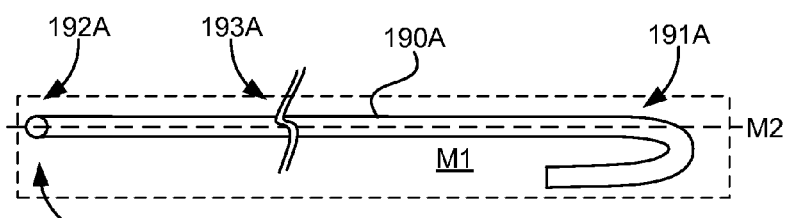
FIG. 27C

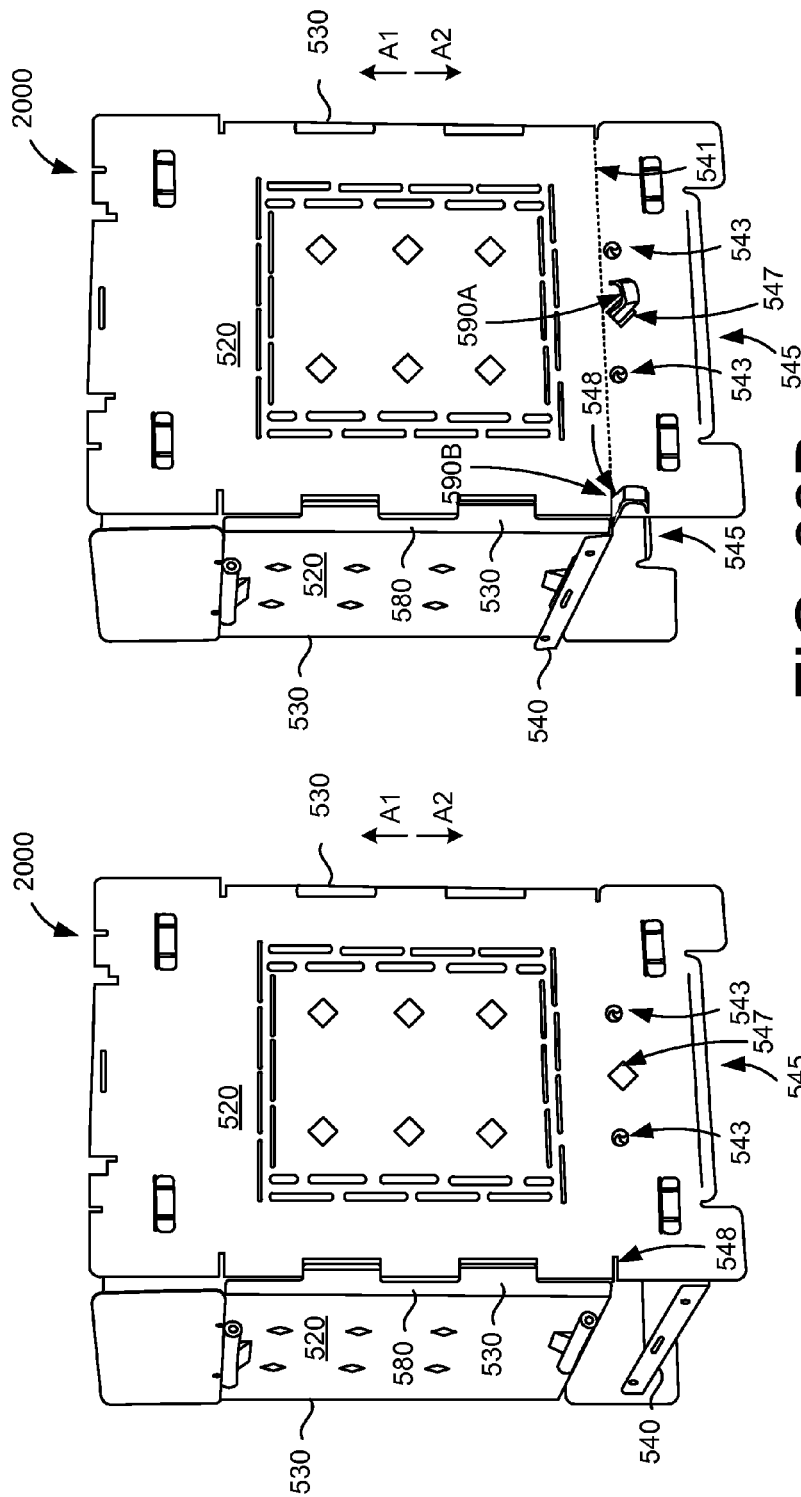
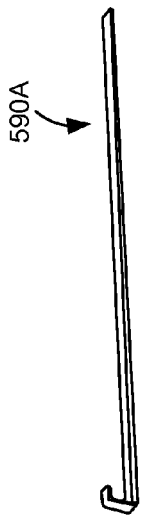
FIG. 33A  FIG. 33B  FIG. 34

COLLAPSIBLE COMBUSTION CONTAINER DEVICES

RELATED APPLICATIONS

This Application claims priority to and the benefit of U.S. Provisional Patent Application No. 61/857,171, filed on Jul. 22, 2013, and claims priority to and the benefit of U.S. Provisional Application No. 61/857,594, filed on Jul. 23, 2013, both of which are incorporated herein by reference their entireties.

This Application is also a Continuation-in-Part of U.S. application Ser. No. 13/023,766, filed on Feb. 9, 2011, which claims priority to and the benefit of U.S. Provisional Patent Application No. 61/302,665, filed on Feb. 9, 2010, both of which are incorporated herein by reference in their entireties.

TECHNICAL FIELD

This disclosure relates generally to collapsible devices for containing a combustion reaction and methods for use thereof.

BACKGROUND

Portable stoves and other devices that allow the preparation and containment of a fire or other manner of combustion are often used when camping or during times of an emergency. Such devices are useful for cooking, water purification, heat, as well as other numerous uses.

Many of such devices can be light weight and portable. Because of this conscience effort to reduce size and weight, most of such devices also depend on a fuel canister in order to provide fuel for the fire. While fuel canisters are convenient, they typically provide only a finite and limited amount of fuel and will eventually become useless if not refilled once empty. Furthermore, such canisters present an extra object of significant size and weight to be carried by a user. By contrast, portable devices which are capable of utilizing wood or other fuel sources present the advantage of being able to use a perpetual supply of fuel that can be found in nature. The general drawback is that, such devices are often heavy, require assembly of several pieces, or are bulky to transport or store.

One problem in attempting to reduce the size and bulk of devices that utilize wood or other solid fuel sources is that as the device becomes smaller, the chamber that is capable of holding fuel must become smaller. Unlike liquid or gas fuels, wood and other solid fuels do not typically allow for heat to be precisely focused or varied in intensity, and are limited to the overall area provided by the combustion chamber. Thus by limiting the space in which such fuels can combust, the amount of heat and energy released is greatly reduced. If a combustion chamber is made too small, the heat produced can be limited to the point that it becomes less useful for activities requiring significant heat such as cooking and boiling water. Moreover, as the overall size of the device shrinks, so does the available effective cooking surface upon which a pot, pan, or other cooking device can be placed.

SUMMARY

Accordingly, the present disclosure provides collapsible combustion container devices that are capable of utilizing a variety of solid fuels and producing a significant heat output from a relatively small chamber size or area. Such devices are typically light weight, and capable of collapsing into a small (i.e. nearly flat) configuration for storage and portability.

In one implementation, such a device can take the form of a combustion container that includes a plurality of vertically oriented panels joined by hinges and a plurality of hinge pins engaged in a plurality of the hinges. The hinge pins can be configured to form at least part of a base that supports the container, or at least part of a heating platform above the container, or both. Additionally, at least two of the vertically oriented panels can contain fuel openings. Such fuel openings are configured to facilitate control of combustion within the container at a location where fuel inserted through one opening converges with or otherwise contacts fuel inserted from another opening.

Implementations additionally include methods of controlling a size of a base and/or a heating platform of a collapsible combustion container and methods of controlling a location of combustion inside a combustion container. In the case of the former, generally, such methods include providing a container as recited herein, and actuating (i.e. rotating) an end of the hinge pins in the container in a manner selected to either expand or reduce a size of a base or a heating platform, or both. In the latter case, such methods include providing a container as recited herein and inserting fuel pieces through fuel openings in the container such that the fuel pieces from each opening converge at a location within the container that is the desired combustion location.

There has thus been outlined, rather broadly, various features so that the detailed description thereof that follows may be better understood, and so that the present contribution to the art may be better appreciated. Other features are described in the following detailed description, taken with the accompanying claims, or may be learned by the practice of the implementations.

BRIEF DESCRIPTION OF THE DRAWINGS

FIG. 2 is a top side perspective view of a combustion container in accordance with one embodiment.

FIG. 3 is a corner top perspective view from a corner adjacent to the corner of FIG. 1, of a combustion container in accordance with one embodiment.

FIG. 5 is a side view from a corner of a combustion container in accordance with one embodiment.

FIG. 6 is a side view of a combustion container in accordance with an embodiment.

FIGS. 14-18 show a method of collapsing a combustion container in accordance with one embodiment.

FIGS. 27A through 27D are diagrams that illustrate support pins according to an implementation.

FIGS. 33A through 33C are diagrams that illustrate various views of another container.

FIG. 34 is a diagram that illustrates another support pin.

DETAILED DESCRIPTION

Figure 1:
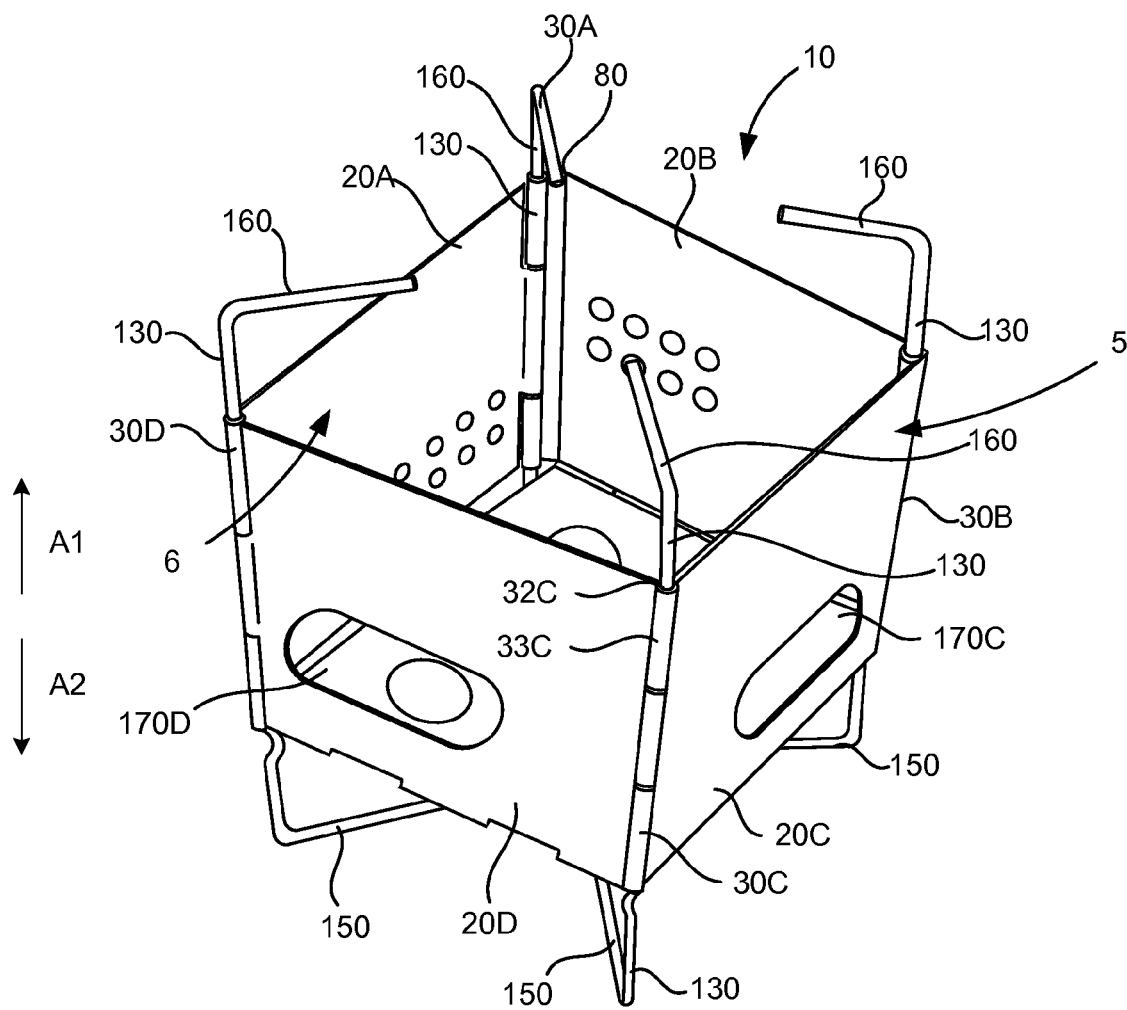
FIG. 1 is a corner top perspective view of a combustion container in accordance with one embodiment.

FIG. 1 illustrates a container 10 (which can be referred to as a collapsible combustion container) in accordance with one embodiment. The container 10 generally has a first pair of vertically oriented panels 20A, 20B joined to one another by a hinge 30A. A second pair of vertically oriented panels 20C, 20D is also joined by a hinge 30C. In one embodiment the panels of the first pair 20A, 20B may each have an equal width, or a substantially equal width, and the panels of the second pair 20C, 20D may each have an equal width or substantially equal width that is less than the width of the panels of the first pair 20. A third hinge 30B joins one panel from the first pair (e.g., panel 20B) to one panel of the second pair (e.g., panel 20C), and a fourth hinge 30D joins the other panel (e.g., panel 20A) from the first pair to the other panel (e.g., panel 20D) of the second pair such that the pairs of panels (20A through 20D) form a box shaped perimeter. The box shaped perimeter may generally have an outside or exterior surface 5 (which can be labeled A through D to correspond with the panels) and an inside or interior surface 6 (which can be labeled A through D to correspond with the panels). The interior surface defines a chamber 7 (also can be referred to as a container). The chamber 7 (or open space) created or defined within the interior surfaces 5 of the panels 20A through 20D are suitable for containing or housing a combustion reaction, such as a fire.

In this description, the vertical direction is aligned along the direction of the hinges 30A through 30D (which can collectively be referred to as hinges 30). This direction is illustrated as direction A1 or as direction A2 in FIG. 1. Direction A1 is pointing toward a top (or cooking end) of the container 10 and direction A2 is pointing toward a bottom (or support end) of the container 10. A horizontal (or lateral) direction or plane is aligned substantially orthogonal to the directions A1, A2. These directions A1, A2 are shown in many of the various views.

Figure 13:
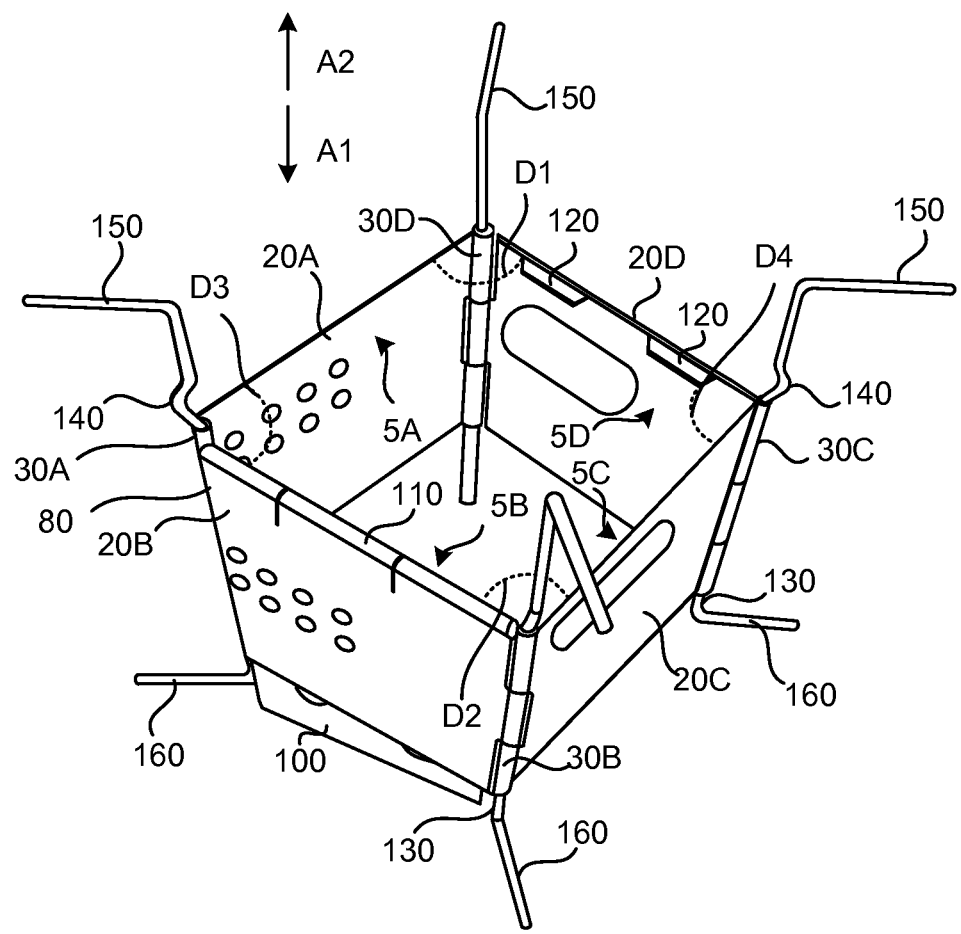
FIG. 13 is a bottom corner perspective view showing hinge pins rotated into a position that expands the base and heat platform of the device with the combustion plate folded flat against an inside of a vertical panel to which it is hingedly attached in accordance with an embodiment.

FIGS. 13-18 illustrate a sequence for collapsing the container 10 in accordance with one embodiment. As shown in FIG. 13, the container 10 stands fully open (in an open configuration) with the combustion plate 100 raised and folded against vertical panel 20B, to which it is hingedly attached via hinge 110.

Figure 14:
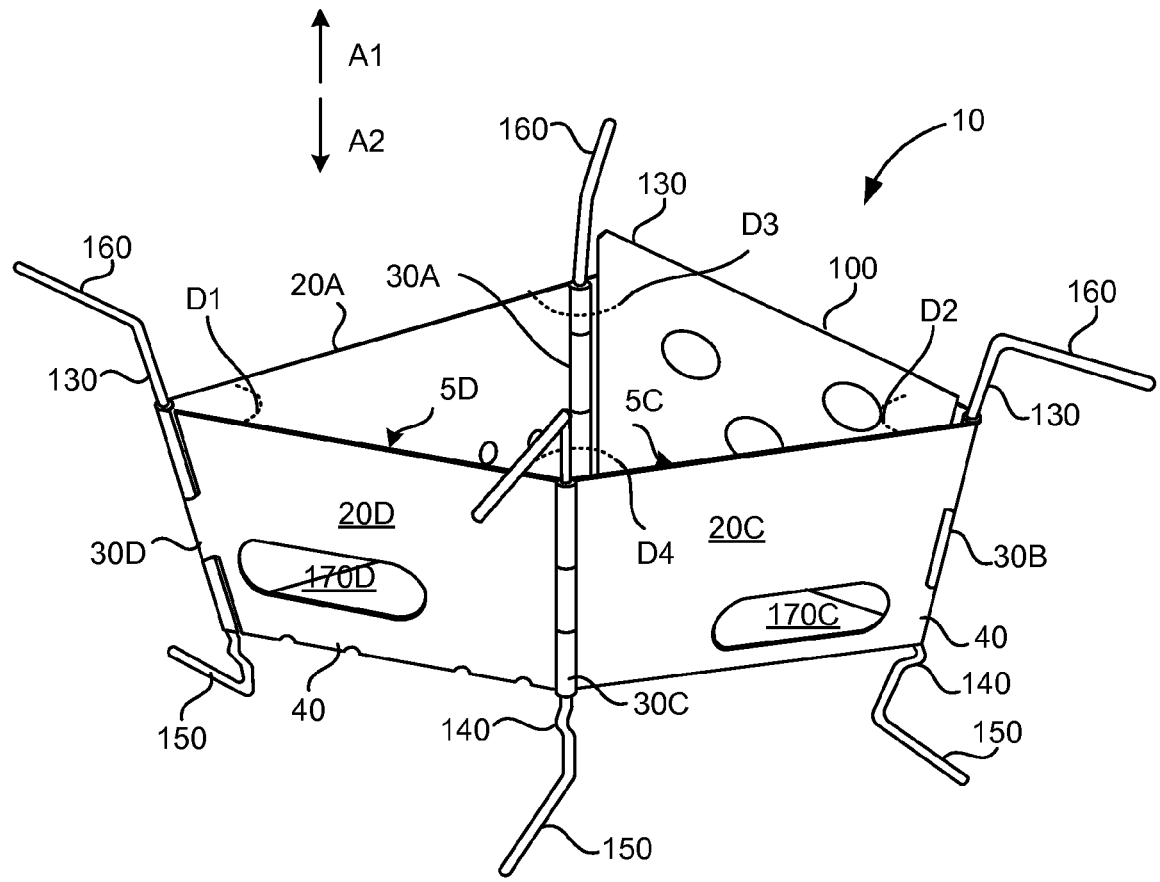

As shown in FIG. 14, a first step in collapsing the container 10 is to move the interior surfaces (e.g., 5C, 5D) of the second pair of panels 20C, 20D toward the interior surfaces (e.g., 5A, 5B) of the first pair of panels 20A, 20B, or alternatively, to move each pair of panels toward the other. This effectively moves hinge 30A toward hinge 30C. In so doing panels 20B, 20C coupled via hinge 30B and panels 20A, 20D coupled via hinge 30D each rotate from an approximate 90 degree angle to an angle that is 30 degrees or less. The angles are labeled as D1 and D2 in FIGS. 13 and 14. Further, panels 20A, 20B coupled via hinge 30A rotates from an approximate 90 degree angle to an angle of from 150 degrees to 180 degrees as do the panels 20C, 20D coupled via hinge 30C. These angles are labeled as D3 and D4 in FIGS. 13 and 14. Because of a relief space feature 80 (shown in at least FIG. 1), the angle D3 may not be the same as the angle D4. Similarly, the angle D1 may not be the same as the angle D2.

Figure 15:
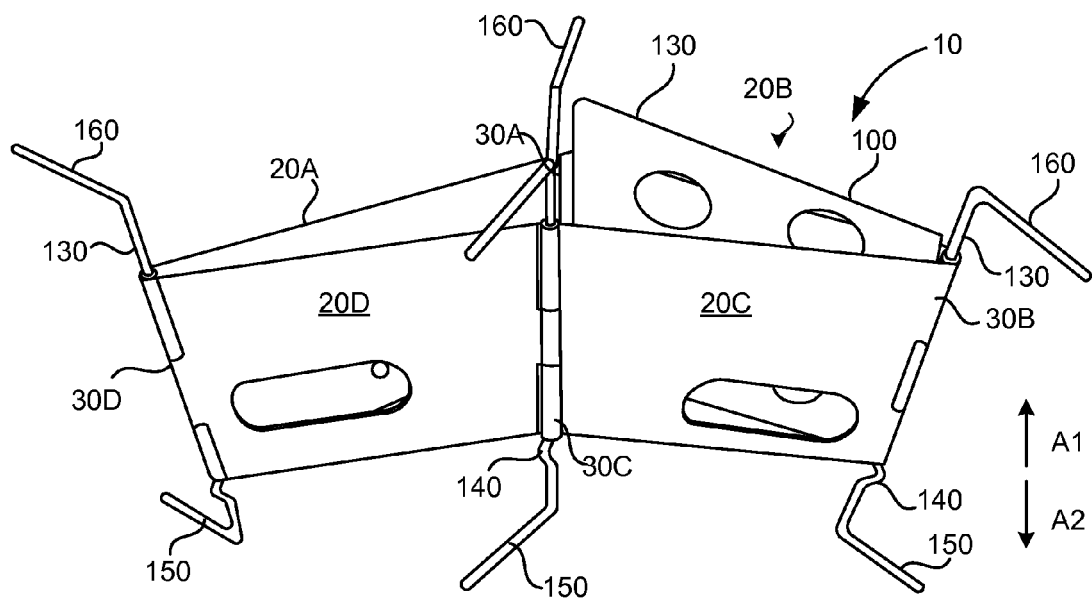

When moved far enough toward one another, the pairs of panels will eventually substantially contact one another. For example, panel 20A from the first pair 20A, 20B will substantially contact (or will contact) panel 20D from the second pair 20C, 20D. As shown in FIG. 14, the combustion plate 100 is disposed between the panel 20B and the panel 20C. In such implementations, the interior surface 5B of panel 20B (which can only be partially seen in this view through the combustion plate 100) may not contact the interior surface 5C of panel 20C. In this configuration, the hinges 30B and 30D can be referred to as being closed or in a closed configuration (also can be referred to as a collapsed configuration or state). In FIG. 15, the panels 20 and 40 are shown moved even closer together.

Figure 16:
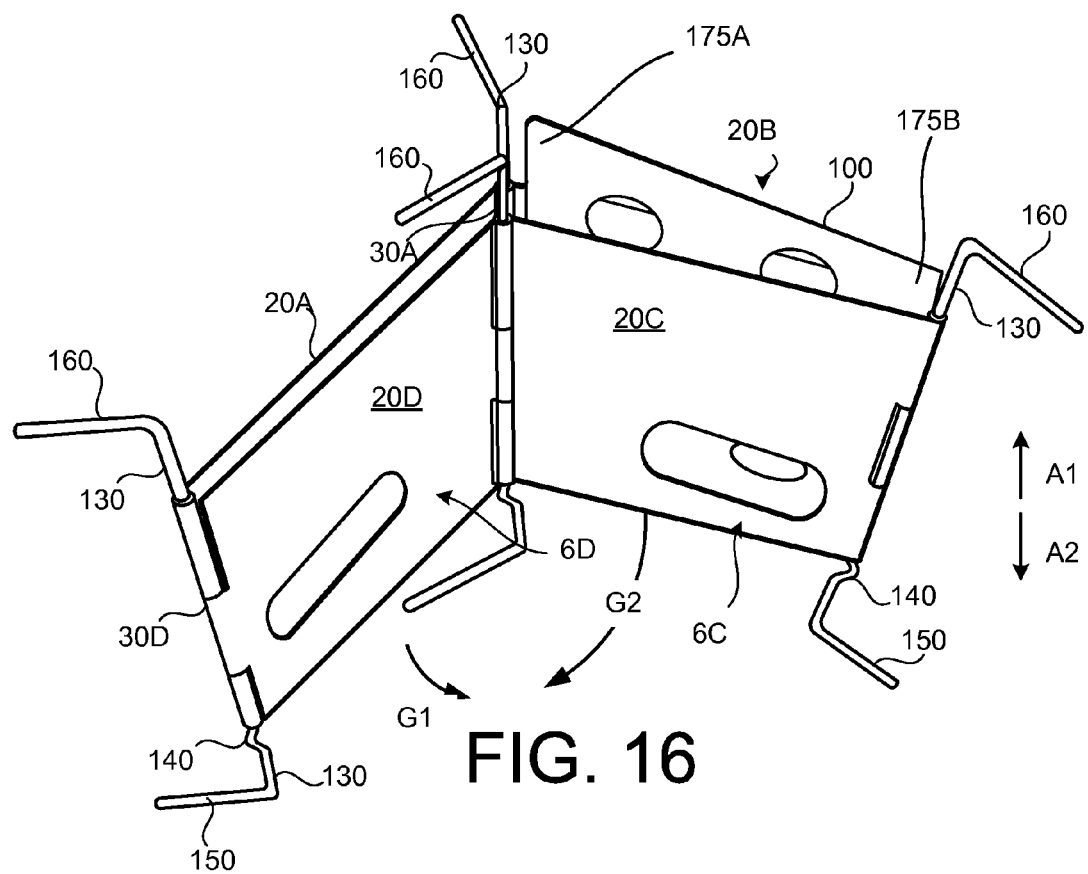
Figure 19:
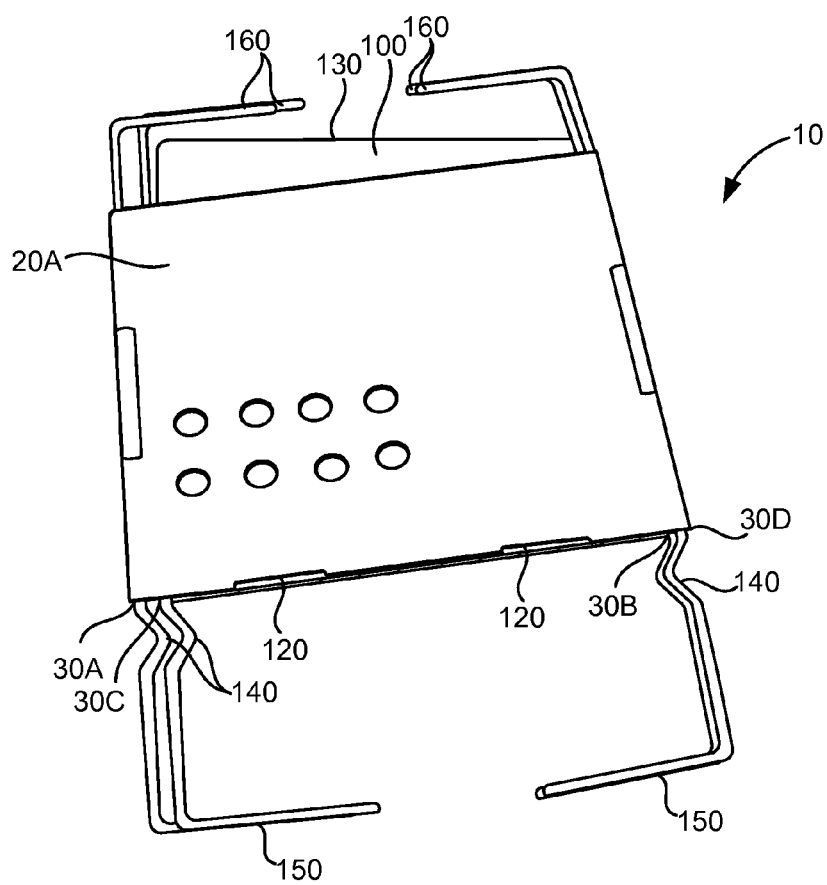
FIG. 19 shows a side view of a combustion container in a closed configuration in accordance with one embodiment.
Figure 20:
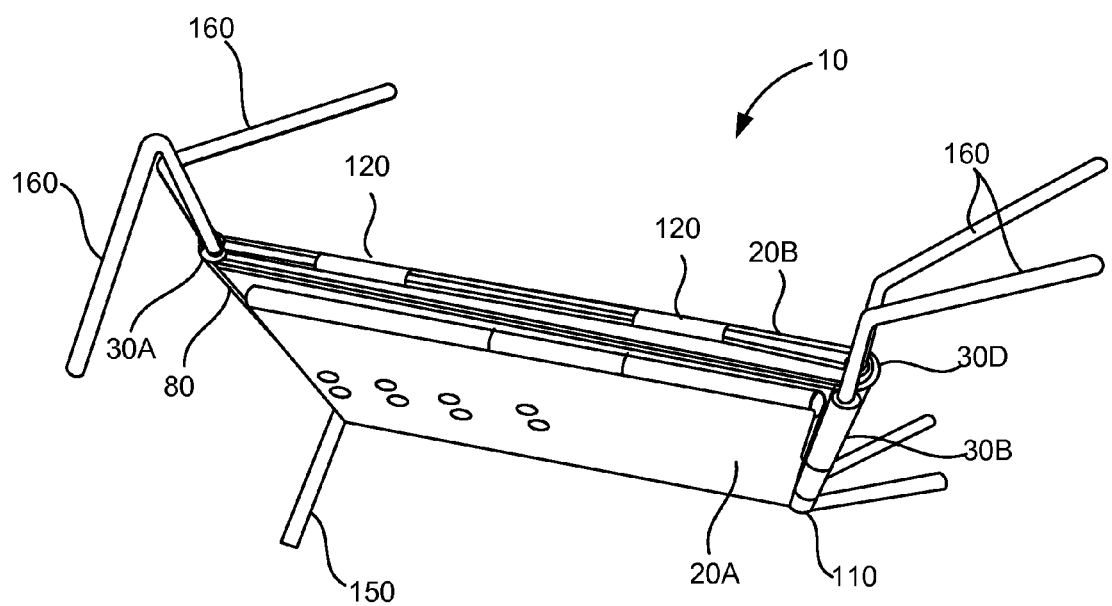
FIG. 20 shows a bottom view of the device as collapsed in FIG. 19 according to an embodiment.

In FIG. 16, the second step in collapsing the container 10 is shown. At this point in the collapse process, each of the second pair of panels 20C, 20D is brought together so that the exterior surfaces 6C, 6D thereof move toward one another (along directions G1, G2). Such motion now begins moving the hinge 30A from its previous 150 degree to 180 degree position to a closed position. Further, hinge 40 is moved from its previous 180 degrees to a further obtuse angle which will eventually close when the hinge reaches an angle of approximately 27 degrees from its starting orientation. As such, in one embodiment, three hinges (e.g., hinges 30A, 30B, and 30D) may be located substantially on the inside of the combustion container 10 and one hinge (e.g., hinge 30C) can be located substantially on the outside. FIG. 17 shows yet further progress in moving panels 20C, 20D toward one another. FIG. 18 shows the final collapsed configuration of the container with all hinges completely closed and the second pair of panels 20C, 20D held between the first pair of panels 20A, 20B and the outside surfaces 6C, 6D of each panel of the second pair 20C, 20D in substantial contact with one another so that in the collapsed configuration (or closed configuration), the container 10 will be flat with the first pair of panels 20A, 20B on the outside of (or disposed around) the second pair of panels 20C, 20D and being oriented substantially parallel to one another. FIG. 19 shows the combustion container 10 in a fully collapsed position (or closed configuration) and FIG. 20 provides a bottom view of the same.

The ability of the container to be oriented into such a flat final collapsed position (or closed configuration) with the panels of the second pair held between the panels of the first pair is provided by relief space feature 80. Referring again to FIG. 1, one example of such a feature is shown. Further, such feature is illustrated in FIGS. 2 and 6. In this embodiment, the relief space feature 80 is a crease, or bend, or fold, created in one of the panels of the first pair 20A, 20B. As can be seen, the relief space feature 80 runs substantially the entire length of the panel and is parallel, or substantially parallel to a vertical edge thereof. Moreover, the relief space feature 80 has a bend of sufficient size to create a relief space that accommodates the entire thickness of the second pair of panels 20C, 20D, and in some embodiments the combustion plate 100. The amount of relief space needed can be selected in order to achieve a specific result as needed. For example, as the thickness of the panels of the second pair 20C, 20D vary, so can the amount of relief space provided. This can be achieved by controlling the angle and/or width of the crease or bend. Further, in some aspects, multiple creases or bends can be used.

Referring again to FIG. 1, the relief space feature 80 may be located laterally at any desired point in the panel (e.g., panel 20B). However, in one aspect, it may be located between the middle of the panel (e.g., panel 20B) and the hinge (e.g., hinge 30A) joining the panels of the first pair 20A, 20B. In another aspect, the relief space feature 80 may be located at a location that substantially matches a location to which the hinge 30C joining the pair of second panels 20C, 20D extends between the first pair of panels 20A, 20B when the container is in a fully collapsed (or closed) orientation or configuration. This is true when one or multiple bends, creases, or folds are used to create the relief space feature 80.

In another embodiment, the relief space feature 80 may include multiple bends, folds, or creases in the same panel (e.g., only panel 20B) or adjacent panels (e.g., panel 20A and 20B). Each crease, bend, or fold runs the entire length (i.e. height) of the panel, and runs substantially parallel to a vertical edge thereof. The cumulative fold or bend of such feature will typically have a size that is cumulatively sufficient to create a relief space that accommodates the entire thickness of the folded panels of the second pair 20C, 20D. In some embodiments, one crease, bend, or fold may be located proximate to one hinge of a panel and a second crease, bend, or fold may be located proximate to the other hinge of the same panel. In other words, one crease, bend, or fold may be proximate to the hinge 30A joining the panels 20A, 20B of the first pair, while the second crease, fold, or bend may be located in the same panel, but proximate to either the third hinge 30B or the fourth hinge 30D. In some aspects, both panels of the first pair 20A, 20B may have relief space features that include two or more bends, creases, or folds as recited herein. For example, both panels 20A, 20B may have a relief space feature adjacent to hinge 30A (i.e. one on each side of hinge 30A). Such creases or folds would be consistent with the other embodiments of relief space features recited herein.

Referring now to FIG. 2, is shown an optional combustion plate 100. Combustion plate 100 can be a surface upon which, or over which, the combustion reaction, such as a fire, may take place. In some embodiments, the combustion plate 100 may be hingedly joined with the hinge 110 to one of the panels of either the first (e.g., 20A, 20B) or second pair (e.g., 20C, 20D), and in yet a further embodiment, the hinge 110 may allow the combustion plate 100 to pivot in an upward direction between the panels when the combustion container 10 is being collapsed for storage. In such a case, the combustion plate 100 will also fit into the relief space defined by the relief space feature 80 and the thickness of the relief space may be adjusted to accommodate the presence of the combustion plate 100.

In some embodiments the combustion plate 100 may be attached either to a panel of the first pair 20A, 20B or a panel of the second pair 20C, 20D. In one specific embodiment, the combustion plate 100 may be attached to a panel of the first pair which has a relief space feature 80 therein. In another embodiment, the combustion plate 100 may be attached to a panel of the second pair 20C, 20D which folds up against the panel of the first pair 20A, 20B having the relief space feature 80 therein. In another embodiment, the combustion plate 100 may not fold between the panels when the container 10 is collapsed, but may fold toward an outside surface (e.g., one or more of the exterior surfaces 6A through 6D) thereof instead.

Figure 4:
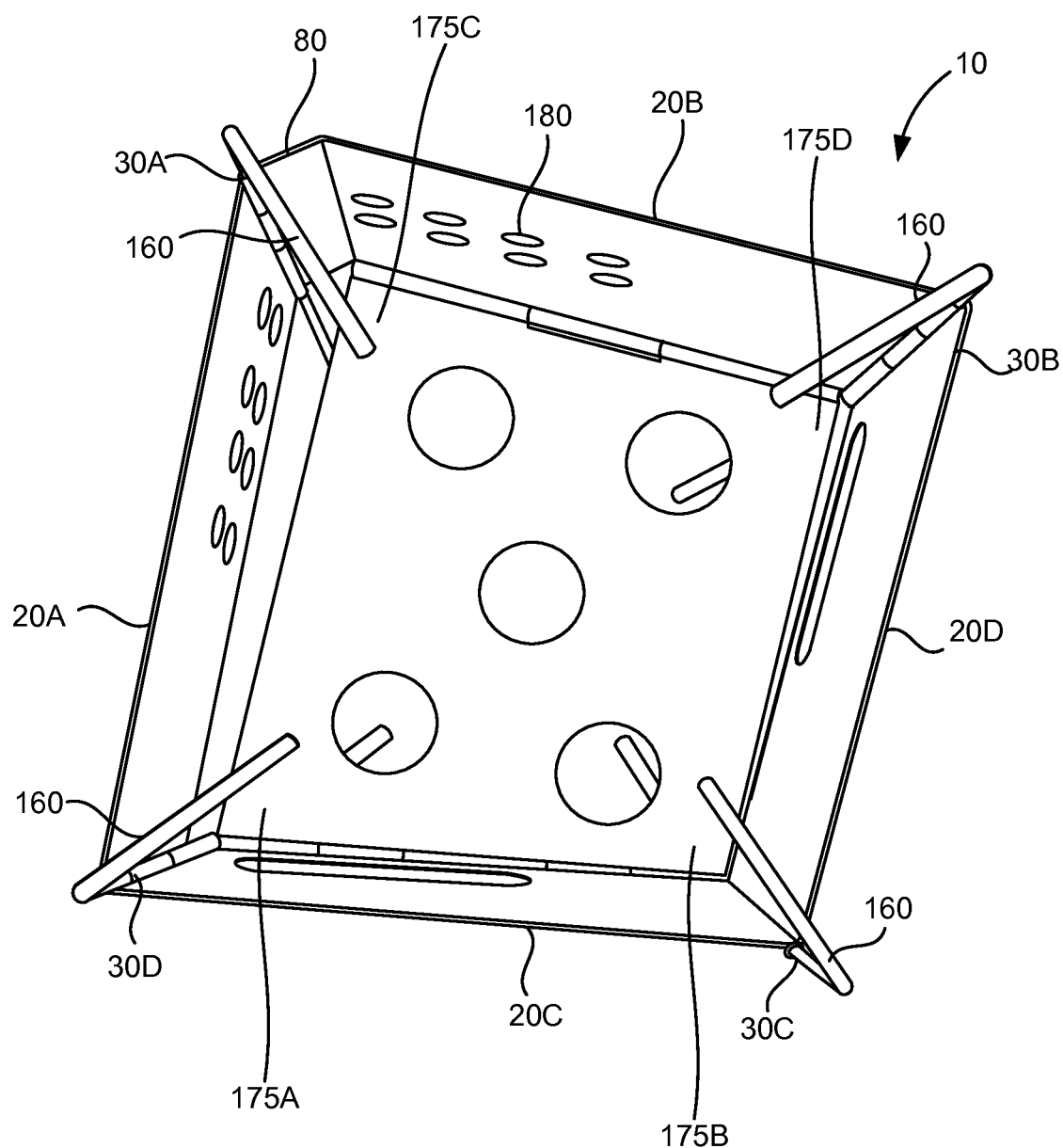
FIG. 4 is a top view of a combustion container in accordance with one embodiment.
Figure 7:
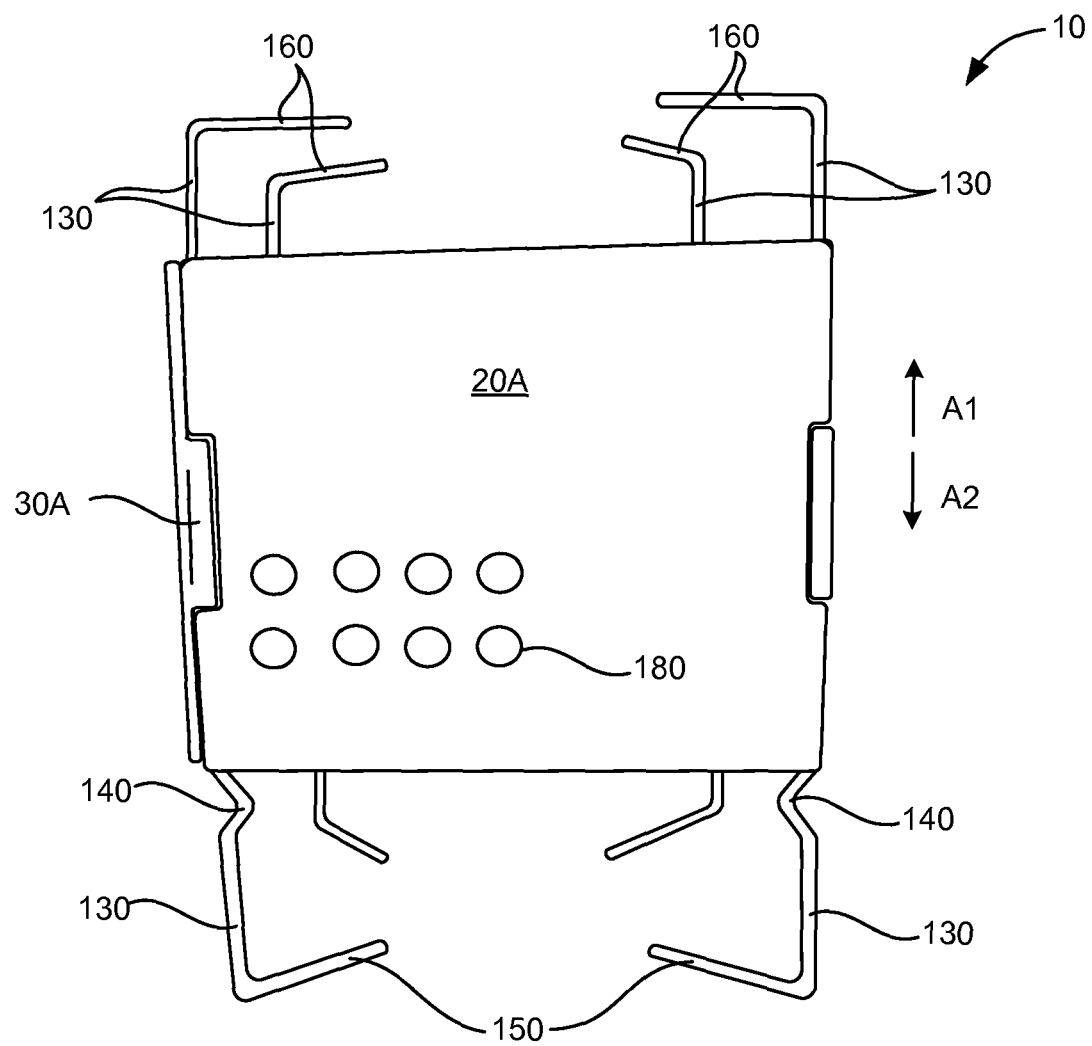
FIG. 7 is a side view showing a side adjacent to the side shown in FIG. 6 in accordance with an embodiment.
Figure 8:
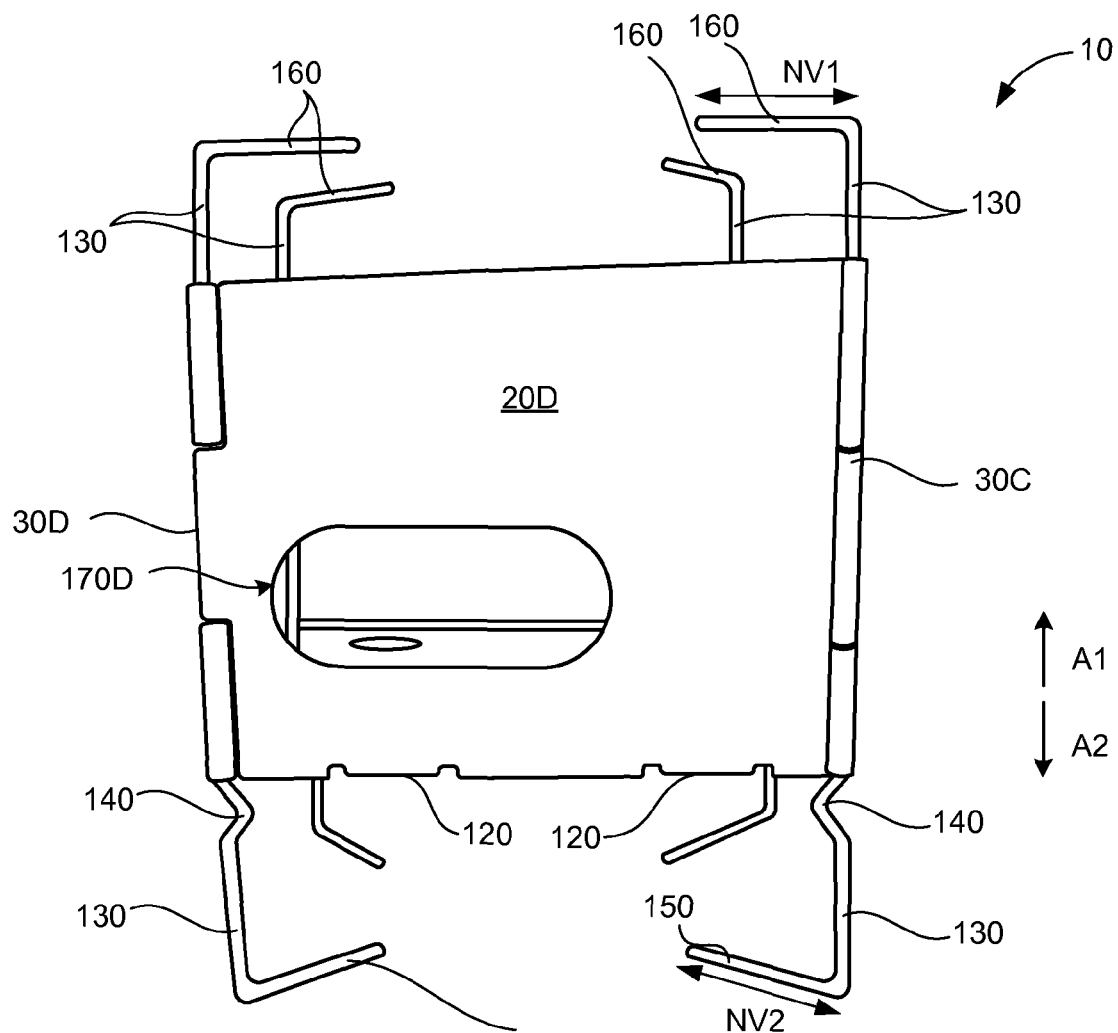
FIG. 8 is a side view showing a side adjacent to the side shown in FIG. 7 and across from the side shown in FIG. 6 in accordance with an embodiment.

In some implementations, the combustion plate 100 may have a non-square shape. For example, each side of the combustion plate 100 can have a different length. At least one of the corners (e.g., two of the corners 175C, 175D shown in FIG. 4) of the combustion plate 100, on the hingedly coupled side of the combustion plate 100 can be, can have right angles (e.g., 90 degree angles, or substantially 90 degree angles) and the remaining corners 175A, 175B (shown in FIG. 2 and in FIG. 16) of the combustion plate 100 can define an acute angle or an obtuse angle. In some implementations, more than 3 corners of the combustion plate 100 can define an angle that is not a right angle.

As shown in FIG. 13, in one embodiment, the one of the vertical panels 20A through 20D may have tabs 120 formed along thereof. The tabs 120 receive a swinging end 130 of the combustion plate 100 when it is deployed into a horizontal orientation (as shown in FIG. 2) for use. The tabs 120 may each be aligned along a plane non-parallel to (e.g., orthogonal to) a plane of the panels 20A through 20D. Such tabs may be located on the bottom of any of the vertical panels 20A through 20D. However, in one embodiment, the tabs are located at the bottom of a panel (e.g., panel 20D) opposite a panel (e.g., panel 20B) to which the hinge 110 for actuating the combustion plate 100 is attached. Once oriented into a lowered position, the combustion plate 100 creates a flat surface extending across the bottom of the chamber 7 (e.g., open space or combustion space) of the container 10. The flat surface effectively forms the bottom of the box defined by the container 10 when in an open configuration and can then be used to support a combustion reaction, such as a fire or other form of combustion. Additional mechanisms, such as ledges or tabs, slots, grooves, etc. can be used to catch and engage the swinging edge (non-hinged side) of the combustion plate 100. As depicted, the combustion plate 100 includes a plurality of apertures or holes therein for the purposes of ventilation. Such holes are optional, but when present can take nearly any shape or size desired in order to achieve a specific end result, and may in some aspects be specifically formed to accommodate a specific level of ventilation for a specific combustion material. Moreover, the combustion plate 100 need not be fixed in position, or located only along the bottom edge of one panel as shown. Rather, the plate can be positioned at any height within the open space of the container 10 and can be either permanently or temporarily fastened therein, for example by providing ledges or slots or grooves into on which the combustion plate 100 can rest. In some embodiments, the combustion plate 100 may not be hingedly affixed to the bottom edge of any of the panels 20A through 20D at all, but rather multiple or more than one of the panels 20A through 20D may have tabs 120 and the combustion plate 100 may merely rest on top thereof.

In one embodiment, an ash tray (not shown in FIGS. 1-23) may be used to collect ashes or other debris falling from the combustion plate 100. Generally the ash tray is a solid sheet of material that is combustion proof or fire proof, such as the metal material of the rest of the container unit. In some aspects the ash tray is substantially flat, and may in some embodiments have upwardly curling edges on opposing ends thereof. Such ends facilitate or ease the ability of a user to grasp the ash tray when placed on the ground or other flat surface. Additionally, in some embodiments, the ash tray may have a handle or other features which allow its handling when hot. The ash tray may in some embodiments engage the combustion container below the combustion plate and be effectively suspended above the ground. In one example, the ash tray may rest on protrusions or non-vertical segments of the hinge pins. In other embodiments, the ash tray may simply rest on the ground underneath the combustion container. More details related to the ash tray are described in connection with at least FIG. 33A Other features may be included such as varying panel height, dampers, hook pins, etc., as recited in Applicant's co-pending U.S. patent application Ser. No. 13/023,766, filed on Feb. 9, 2011, which is incorporated herein by reference.

Referring again to FIG. 1, the hinges 30A, 30C, 30B, and 30D joining the plurality of panels 20A through 20D use hinge pins 130. The hinge pins 130 (or portions thereof) can be labeled or referred to in correspondence with the hinges 30A through 30D. For example, the hinge pin 130 (or portions thereof) associated with hinge 30A can be referred to as hinge pin 130A. Portions of the panels 20A through 20D define one or more a sleeves (also can be referred to as a knuckle) (e.g., sleeve 33C) having an opening (e.g., opening 32C) through which the hinge pins 130 (e.g., a body portion of the hinge pins 130) can be inserted to define the hinges 30A through 30D.

The hinge pins 130 generally include a straight vertical segment (e.g., a body segment or portion) which runs through or functions as part of the hinges 30A through 30D. However, in some embodiments, such hinge pins 130 may include one or more non-vertical segments in order to increase the use and function of the hinge pins 130 beyond their role of simply aiding the hinges 30A through 30D in holding the panels 20A through 20D together.

In some embodiments, the hinge pins 130 can be configured to form at least part of, or all of, a base that supports the combustion container. As shown in FIG. 6, in some embodiments, one or more of the hinge pins 130 can each include one or more non-vertical segments 140 (which can be referred to as support segments) below the container 10. For example, the hinge pin 130A includes a non-vertical segment 140A. In this implementation, the non-vertical segment 140A is shown as a bend in the hinge pin 130A. Such non-vertical segments may be used to hold the container above, for example, a ground, and in some embodiments the height above the ground may be a predetermined height based on the location of the non-vertical segment 140. In some embodiments, rather than a bend, the non-vertical segment may take the form of a knob, protrusion, bump, etc., which is of sufficient to hold the container 10 above the ground, for example, by allowing the hinges 30 (e.g., a bottom surface of hinge 30A) of the container 10 to rest on the non-vertical segments 140 (e.g., non-vertical segment 140A).

Also as shown in FIG. 6, the hinge pins 130 can include one or more additional non-vertical segments 150 (which can be referred to as base segments or lower non-vertical segments) which may be aligned parallel to (or substantially parallel to) a bottom of the container 10 (or panels 20A through 20D thereof). Such segments may form "feet" which are a part of a base upon which the container 10 or box rests. While the feet may take nearly any form, size, or shape that is convenient or desired, in some aspects, such non-vertical segments may be a bend of about 90 degrees in the hinge pins 130. As shown in FIG. 6, one specific configuration for the non-vertical segments 150 (e.g., non-vertical segment 150A) is as a substantially straight segment or line (orthogonal to other portions of the hinge pins 130). For example, the non-vertical segment 150A can be aligned orthogonal to a portion of the hinge pin 130A disposed within the hinge 30A. Accordingly, the non-vertical segments 150A through 150D can be disposed within or aligned along a horizontal plane P1 orthogonal to the vertical directions A1, A2. In some implementations, less than all of the non-vertical segments 150A through 150D can be disposed within or aligned along the horizontal plane P1.

In some implementations, the non-vertical segments 150 can have a square shape, a curved shape, a looped shape, and so forth. In some implementations one or more of the non-vertical segments 150 can have different shapes. For example, although not shown, the non-vertical segment 150A can have a first shape (e.g., a loop shape) and the non-vertical segment 150B can be a straight segment.

Figure 23:
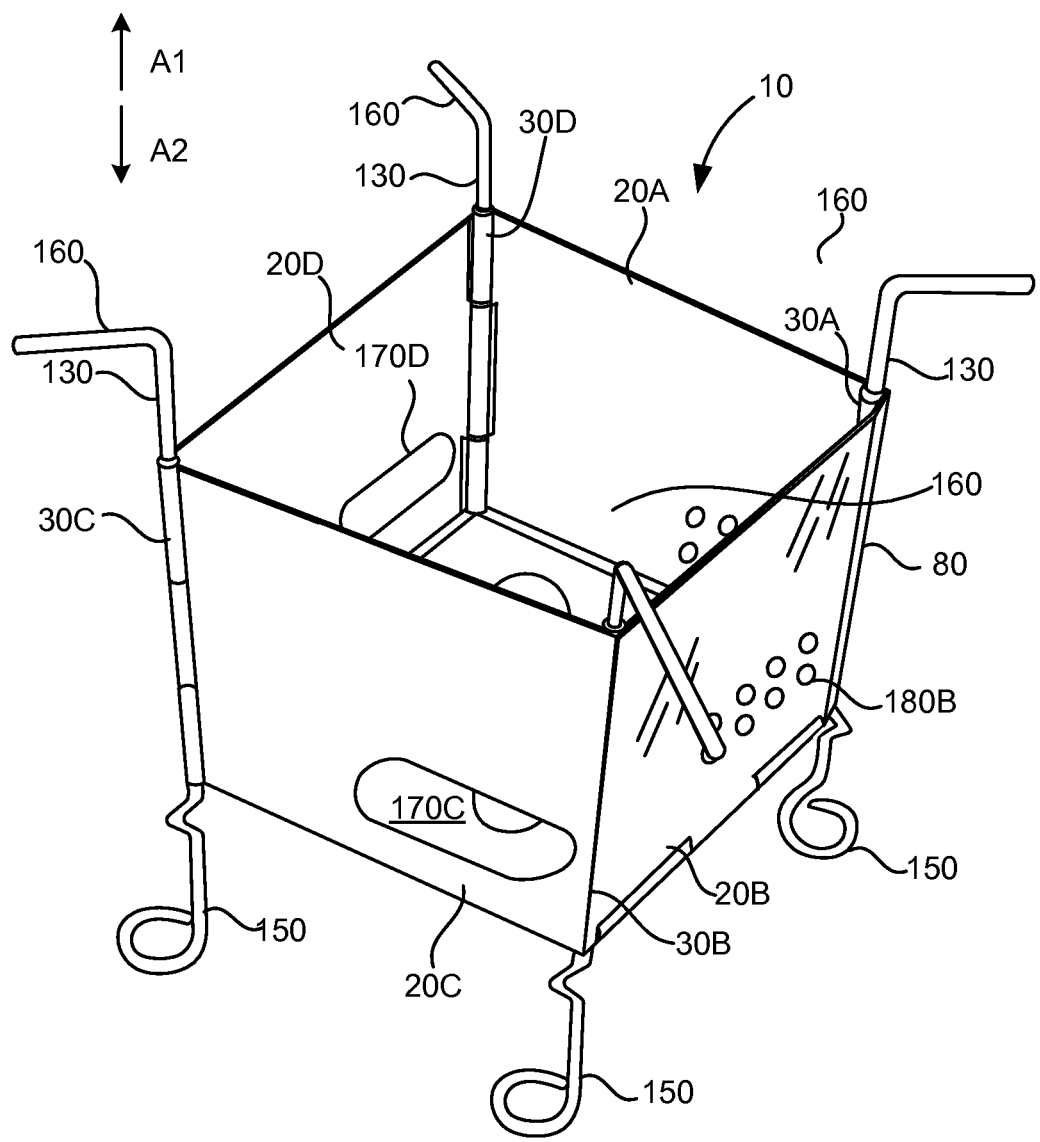
FIG. 23 shows a top perspective view of the device in an embodiment which includes loop shaped feet.

As a specific example, as shown in FIG. 23, the non-vertical segments 150 may take the form of a loop. Such configurations are useful for securing the combustion container 10 to the ground or other soft surface with stakes or pins, etc. For example, when using the container 10 in an outdoor setting it may be useful to utilize tent stakes inserted through the loops of the non-vertical segments 150 to secure the container to the ground. In this manner a greater amount of stability may be obtained when placing cookware on the heating platform that are of a moderate to large size. It should be further noted that the overall length of the hinge pins 130 may be selected in order to achieve any specifically desired effect or utility, such as varying the height above the ground at which the combustion container 10 is held.

In addition to forming a part, or the entire base, the hinge pins 130 may additional form a portion or all of a heating platform (or heating support platform) above the container 10. In one embodiment, the hinge pins 130 may extend past the top of the container 10 (or the panels 20A through 20D thereof) and have a non-vertical segment 160 disposed above the container 10 (or the panels 20A through 20D thereof). The non-vertical segments 160 can be referred to as platform segments or as upper non-vertical segments. In some aspects, the non-vertical segments 160 disposed above the container 10 may form a portion, or all of, a heating platform above the container 10. Nearly any shape or configuration suitable to form part of, or the entire heating platform may be used for the non-vertical segments 160. However, in one aspect, the non-vertical segments 160 may be or define a bend of about 90 degrees. For example, the non-vertical segment 160A can be aligned orthogonal to (or substantially orthogonal to) a portion of the hinge pin 130A disposed within the hinge 30A. Accordingly, the non-vertical segments 160A through 160D can be disposed within or aligned along a horizontal plane P2 orthogonal to the vertical directions A1, A2. Thus the non-vertical segments 160 disposed above the container 10 may form a portion, or all of, a heating platform above the container 10. In some implementations, less than all of the non-vertical segments 160A through 160D can be disposed within or aligned along the horizontal plane P2.

In some implementations, the non-vertical segments 160 can have a square shape, a curved shape, a looped shape, and so forth. In some implementations one or more of the non-vertical segments 160 can have different shapes. For example, although not shown, the non-vertical segment 160A can have a first shape (e.g., a loop shape) and the non-vertical segment 160B can be a straight segment.

In some embodiments the hinge pins 130 can be defined using multiple pieces which are coupled together somewhere inside the hinges 30. However, in other embodiments, each of the hinge pins 130 can be single piece (or monolithic component) running through the entirety of each respective hinge 30. Having the hinge pins 130 as single piece provides the convenience of allowing actuation of one end of the hinge pin 130 simultaneously turning the other end. For example, non-vertical segment 160A is rotated axially around a portion of the hinge pin 130A disposed within the hinge 30A when non-vertical segment 150A is rotated. In some implementations, each of the hinge pins 130 can be configured to rotate 360 degrees (or less) within their respective hinges 30.

As shown in FIG. 6, the various portions of the hinge pins 130 are disposed within a single plane. For example, the non-vertical segment 140A (i.e., support segment 140A), the non-vertical segment 150A (i.e., base segment 150A), and the non-vertical segment 160A (i.e., platform segment) are disposed within or aligned the same plane. In some implementations, the non-vertical segment 140A, the non-vertical segment 150A, and the non-vertical segment 160A may be disposed within or aligned along different planes. For example, the non-vertical segment 160A and/or non-vertical segment 140A may be aligned along a line (or a within a plane) that is non-parallel to (e.g., orthogonal to) a line (or within a plane) along which the non-vertical segment 150A is aligned. Various views of hinge pins are illustrated in FIGS. 25 through 26B.

Figure 25:
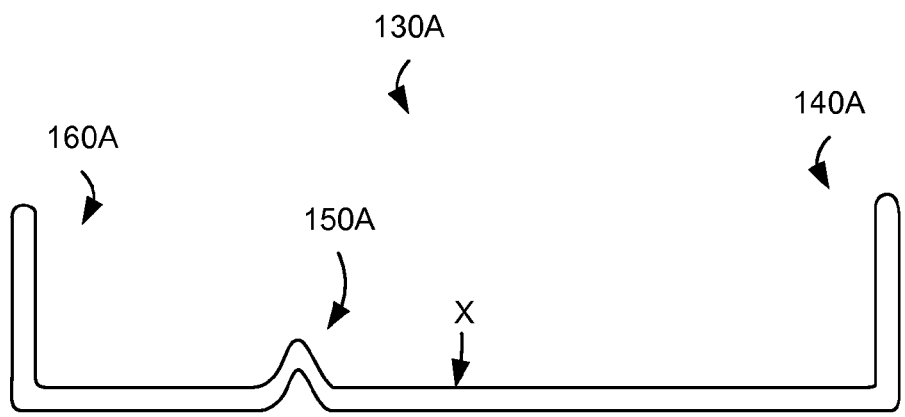
FIG. 25 illustrates an implementation of a hinge pin.

FIG. 25 illustrates a side view of the hinge pin 130A. As shown in FIG. 25, the hinge pin 130A the non-vertical segment 140A (i.e., support segment 140A), the non-vertical segment 150A (i.e., base segment 150A), and the non-vertical segment 160A (i.e., platform segment). As shown in FIG. 25, the non-vertical segment 150A is disposed between non-vertical segment 140A and non-vertical segment 160A. However, the non-vertical segment 150A is disposed to one side (within a medial portion) of a mid-point X along the hinge pin 130A.

Figure 26A:
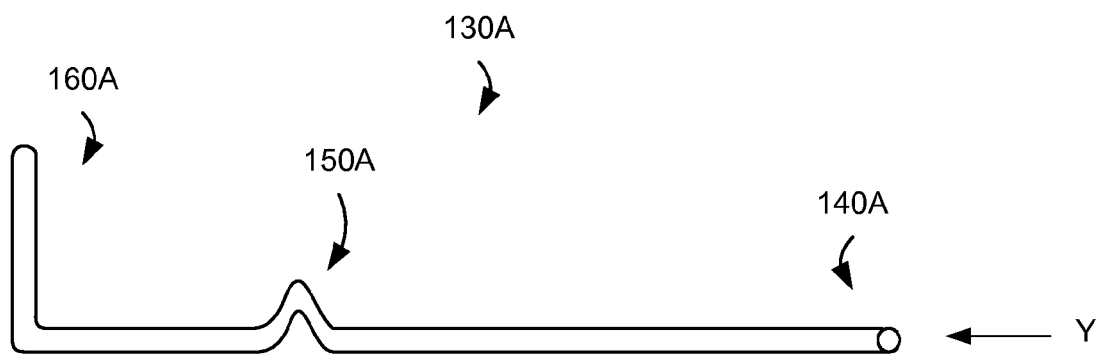
FIGS. 26A and 26B illustrate a variation of the hinge pin shown in FIG. 25.
Figure 26B:
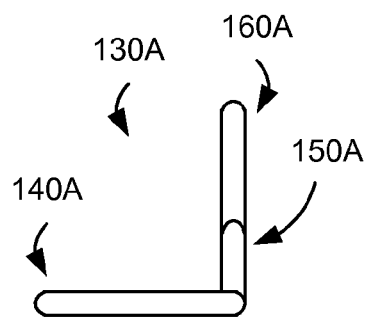

In this implementation, the features of the non-vertical segments 140A, 150A, 160A may be entirely disposed within or aligned along a plane (not shown). In some implementations, one or more of the non-vertical segments 140A, 150A, 160A may be rotated axially such that one or more features of the hinge pin 130A may not be disposed within or aligned along a single plane. Such an implementation is illustrated in FIG. 26A. As shown in FIG. 26A, the non-vertical segment 140A is rotated 90° with respect to the non-vertical segment 160A (rotated about an axis aligned along the hinge pin 130A). A view of the hinge pin 130A from direction Y is illustrated in FIG. 26B. In some implementations one or more of the non-vertical segments 140A through 160A may be rotated axially (about an axis along the hinge pin 130A).

Figure 10:
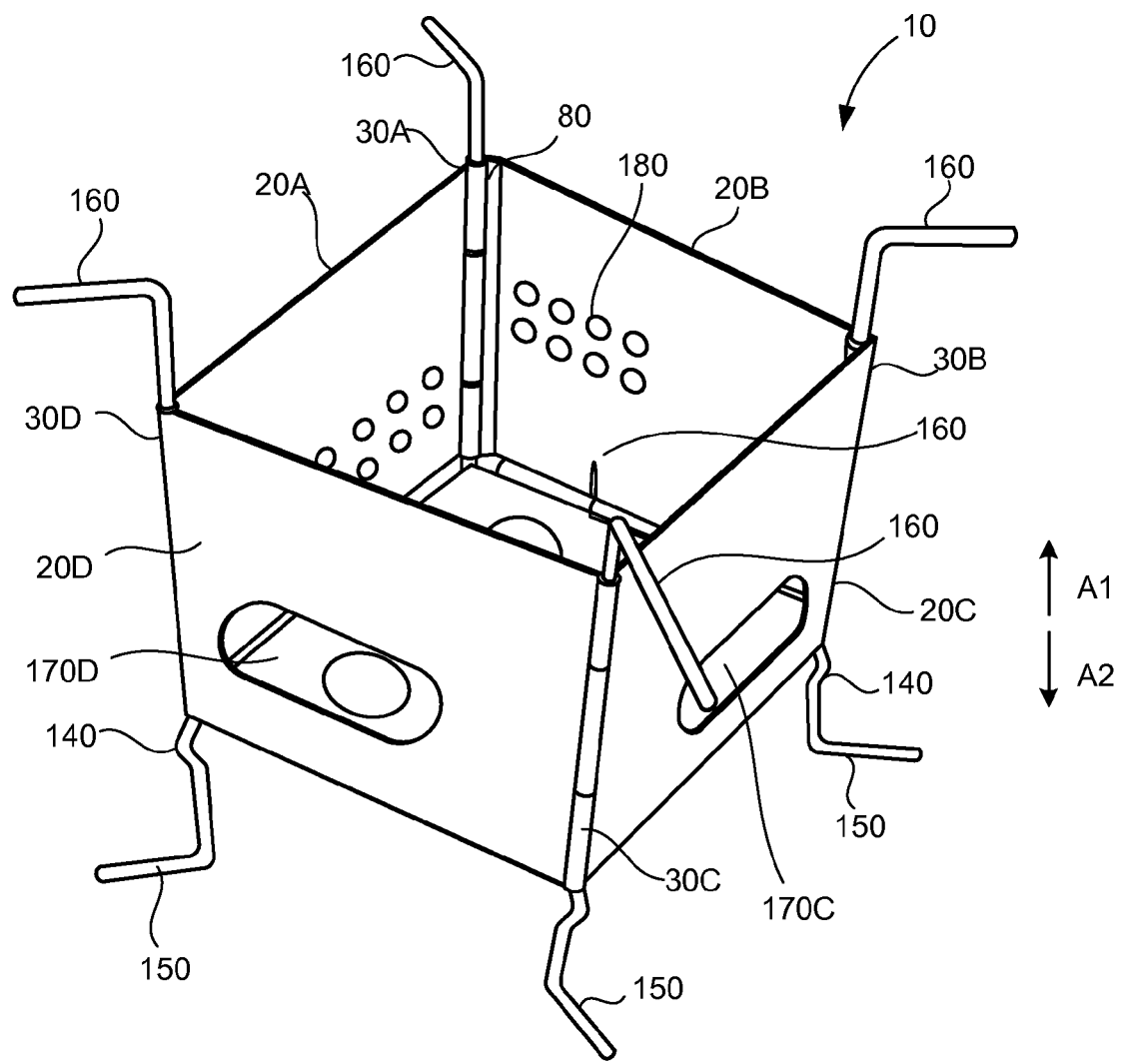
FIG. 10 is a top corner perspective view showing hinge pins rotated into a position that expands the base and heating platform of the device in accordance with one embodiment.
Figure 11:
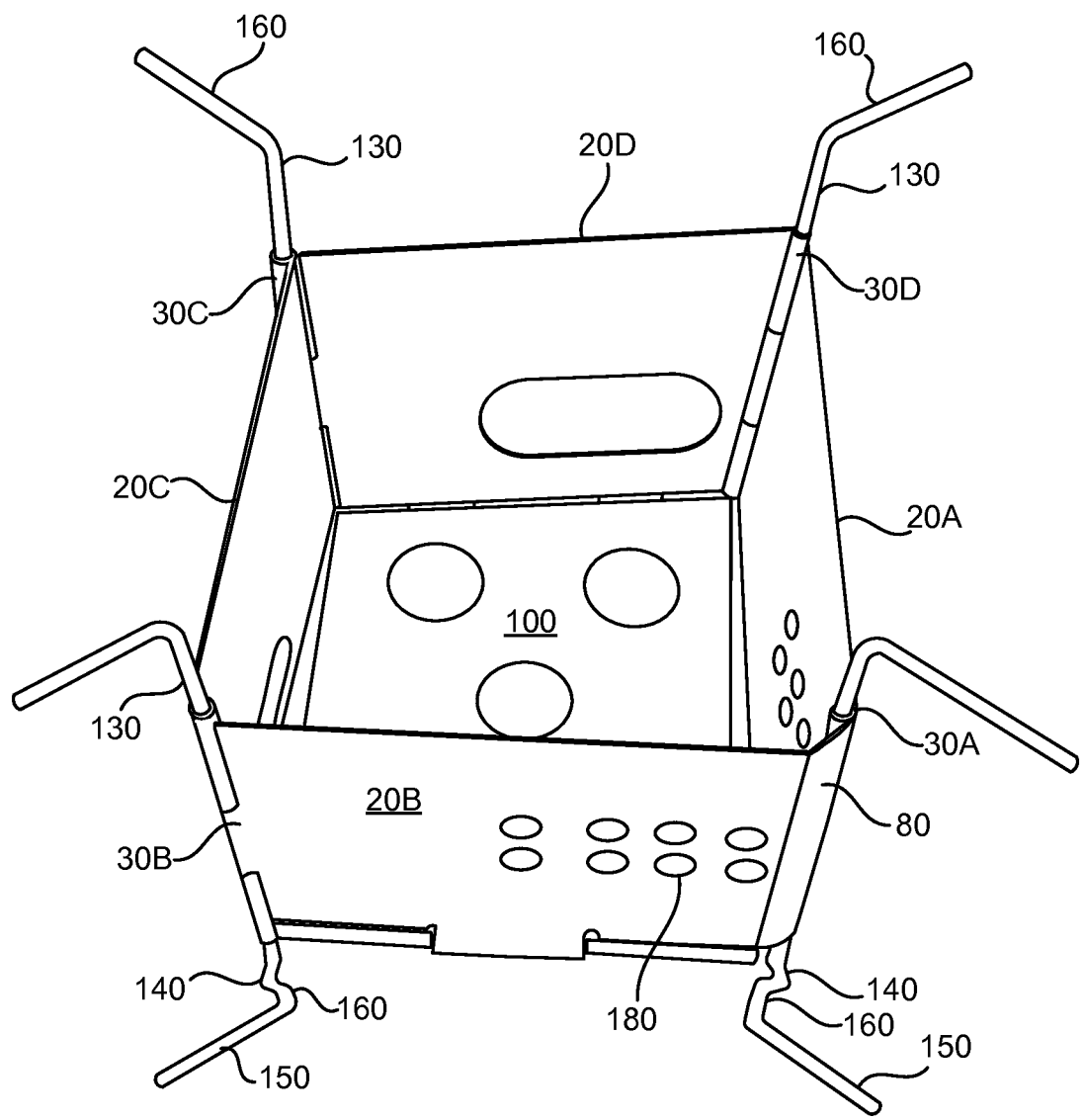
FIG. 11 is a top side view showing hinge pins rotated into a position that expands the base and heating platform of the device in accordance with one embodiment.
Figure 12:
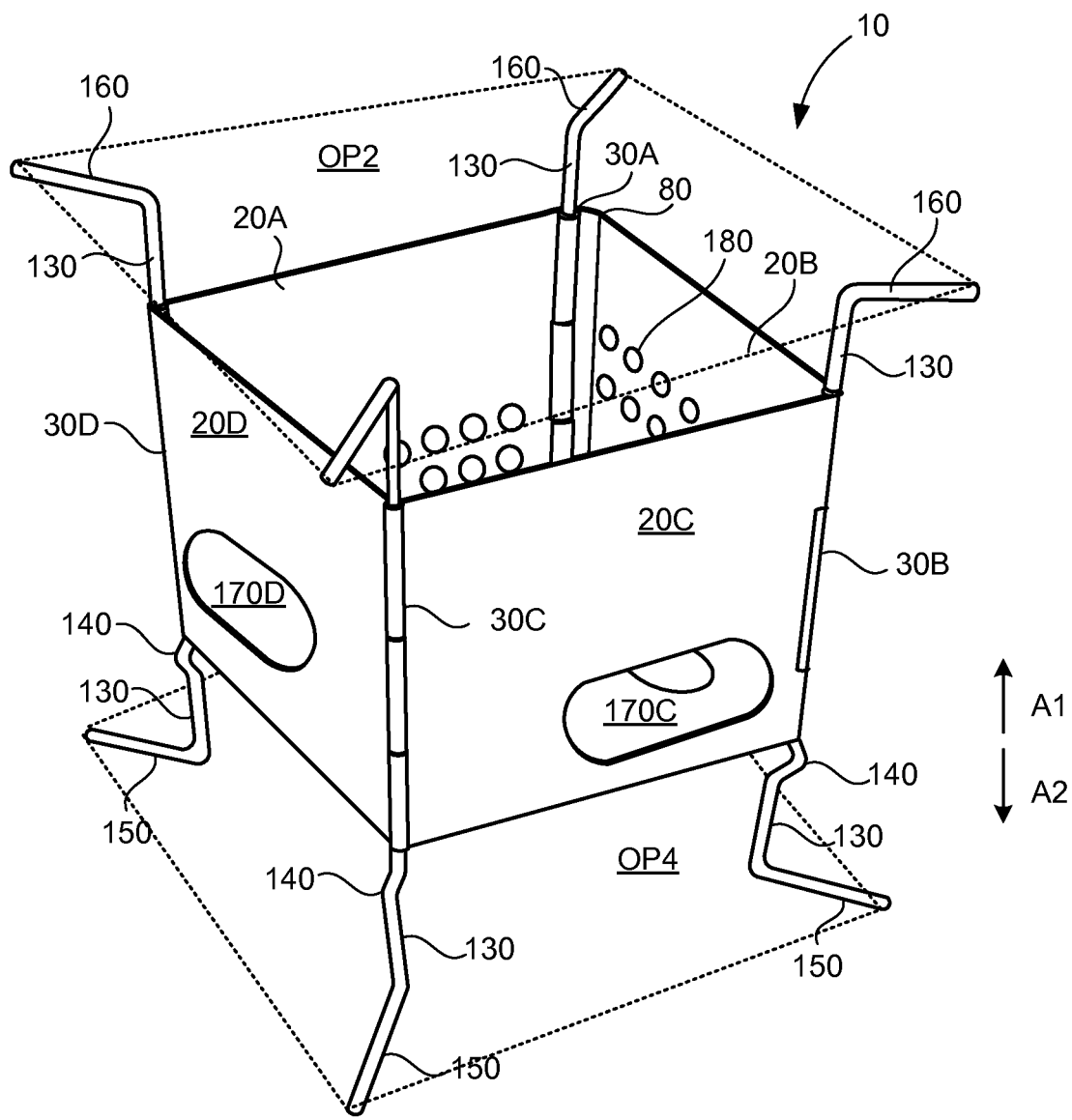
FIG. 12 is an additional top corner perspective view showing hinge pins rotated into a position that expands the base and heating platform of the device in accordance with one embodiment.

Referring to FIGS. 1-9, the upper non-vertical segments 160 of the hinge pins 130 and the lower non-vertical segments of the hinge pins 150 are oriented to face substantially inwardly toward a center of the container. In such a configuration, the heating platform formed by the upper non-vertical segments 160 is suitable for small cooking implements, such as pots or pans to rest thereon. However, as shown in FIGS. 10-12, the upper non-vertical segments 160 are rotated to orient substantially outward from the center of the container. Such an orientation expands the size of the heating platform and is suitable to accommodate larger cookware. In addition, the lower non-vertical segments 150 are also oriented substantially away from a center of the container. This orientation effectively expands the size of the base upon which the container rests, thus providing a greater amount of stability. This greater stability is especially useful when a larger piece of cookware is used on the heating platform. When the hinge pins are a single piece, both the heating platform and base may be effectively expanded or reduced in size simultaneously by simply actuating one end of each hinge pin.

Figure 9:
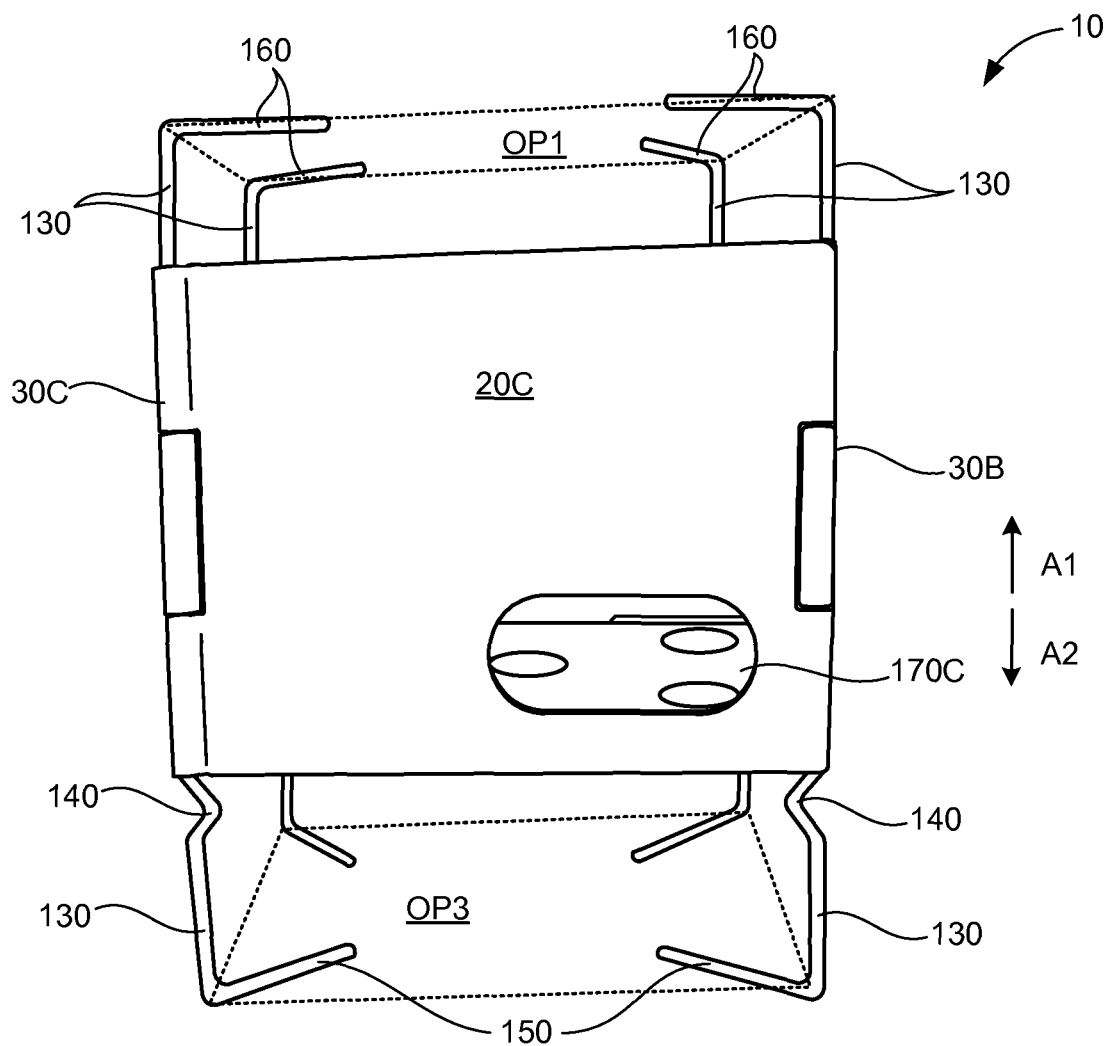
FIG. 9 is a side view showing a side adjacent to the sides shown in FIGS. 6 and 8 and across from the side shown in FIG. 7 according to an embodiment.

Accordingly, a surface area defined by an outer perimeter OP1 defined by the non-vertical segments 160 when rotated in a first configuration (an inward facing configuration) as shown in FIG. 9 is smaller than a surface area defined by an outer perimeter OP2 defined by the non-vertical segments 160 when rotated in a second configuration (an outward facing configuration) as shown in FIG. 12. Similarly, a surface area defined by an outer perimeter OP3 defined by the non-vertical segments 150 when rotated in a first configuration (an inward facing configuration) as shown in FIG. 9 is smaller than a surface area defined by an outer perimeter OP4 defined by the non-vertical segments 160 when rotated in a second configuration (an outward facing configuration) as shown in FIG. 12.

As shown in the figures, the upper and lower non-vertical segments 150 and 160 of the hinge pins 130 are of substantially equal length past the 90 degree bend. However, it is to be understood that the length of each hinge pin 130 (or hinge pin portion) extending past the 90 degree bend can be of any desired length (e.g., length NV1 and/or length NV2 shown in FIG. 8). In some embodiments, one or more of the lower non-vertical segments 150 (e.g., length NV2) may be longer than one or more of the upper non-vertical segments 160 (e.g., length NV1). In other embodiments, one or more of the upper non-vertical segments 160 (e.g., length NV1) may be longer than one or more of the lower non-vertical segments 150 (e.g., length NV2). In yet other embodiments, all of the upper non-vertical segments 160 may be of substantially the same length, while in other embodiments two or more of the upper non-vertical segments 160 may be different lengths. In yet other embodiments, all of the lower non-vertical segments 150 may be of substantially the same length, while in other embodiments two or more of the lower non-vertical segments 150 may be different lengths.

Figure 24:
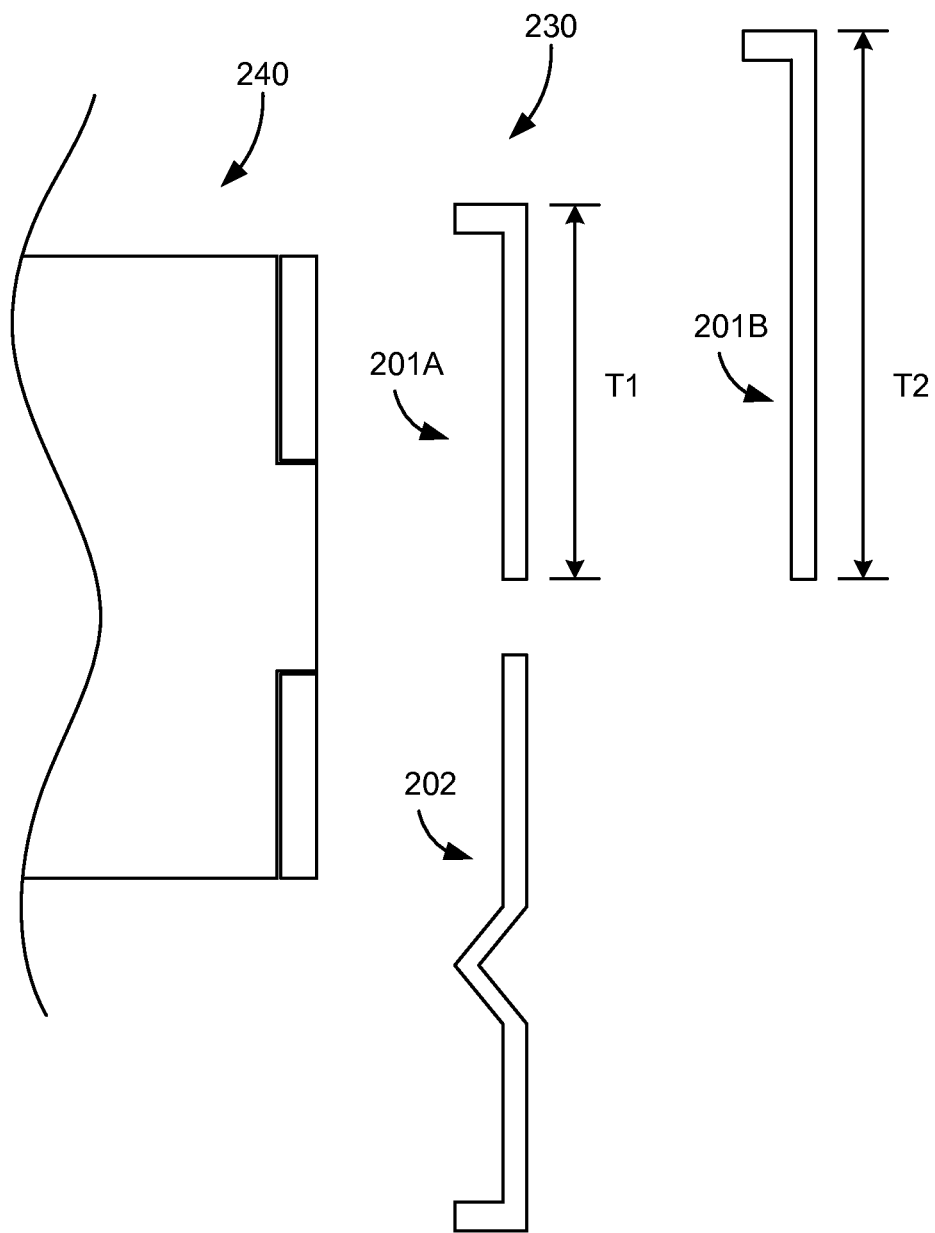
FIG. 24 illustrates a hinge pin having multiple portions.

One additional advantage posed by the container devices described herein is the ability to adjust the distance between the container 10 (or the panels 20A through 20D) thereof and the heating platform defined by the non-vertical segments 160. In an embodiment where the hinge pins 130 are more than one piece (e.g., include multiple pieces or components rather than a monolithic piece), the top portion of the hinge pin which engages the top of the hinge and also aids in creation of a portion of, or the entire heating platform, may be varied in its length. For example, as shown in FIG. 24, different top hinge pin portions 201A, 201B having different lengths (e.g., lengths T1, T2) can be provided and a user can select a given length of the top hinge pin portion in order to establish the distance desired between a top of one or more panels (e.g., panels 20A through 20D) of a container (e.g., container 10) and the heating platform (e.g., heating platform defined by the non-vertical segments 160). In use, a hinge pin of desired length may be selected for each hinge 240 including one of the top hinge pin portions 201A, 201B and as the container is assembled and can be engaged (e.g., coupled) with a bottom hinge portion 202 within (or outside of (e.g., above, below)) the hinge 240. For example, if the top hinge pin portion 201A is selected, the top hinge pin portion 201A may be inserted into a first side (e.g., top side) of the hinge 240. In some embodiments this top hinge pin portion 201A will be moved (e.g., forced, moved downward) until it meets, or substantially meets the bottom hinge pin portion 202 which may likewise be inserted into a second side (e.g., a bottom side) of the hinge and moved (e.g., forced, moved upwards).

In the cases where the hinge pins 130 are a single piece as shown in at least FIGS. 1 through 23, the height (or distance) of the container 10 (or panels 20A through 20D thereof) relative to the heating platform (e.g., heating platform defined by the non-vertical segments 160) may be adjusted by simply sliding one or more of the panels 20A through 20D of the container 10 along (e.g., up, down) the hinge pins 130 toward the upper non-vertical segments 160 (or toward the lower non-vertical segments 150 and/or non-vertical segments 140) until the desired distance between the top (e.g., top of one or more of the panels 20A through 20D) of the container 10 and the upper non-vertical segments 160 is achieved. For example, in such embodiment the container 10 (or panels 20A through 20D) may be held in place at a specific height or distance from the upper non-vertical segments 160 by a mechanism (e.g., a stop mechanism) for so doing. As one example, a clip, band, or other mechanism capable of fastening to, or gripping, one or more of the hinge pins 130 below the container 10 can be used in order to prevent the container 10 from slipping back down the hinge pins 130 from its raised position.

In another example, the hinge pins 130 themselves may be configured with a shape or function (which can be referred to as a releasable stop mechanism) (not shown), such as a depressible spring button, etc. that may function as a stop against which the bottom of one or more of the hinges 30 will rest so as to keep the container 10 (or panels 20A through 20D thereof) from moving in an undesirable direction (e.g., slipping back down) along one or more of the hinge pins 130. In yet another example, the simple friction fit between an interior of one or more of the hinges 30 and one or more of the hinge pins 130 may provide sufficient force to prevent the container 10 from moving (e.g., sliding back down) the hinge pin(s) 130 after the container 10 has been elevated toward the heating platform.

In yet another embodiment, the container 10 can be inverted so that the heating platform (or the non-vertical segments 160) functions the base and the base (or the non-vertical segments 150) functions as the heating platform. In this case, the upper non-vertical segments 160 of the hinge pins 130 can function as a stop below which the panels 20A through 20D of the container 10 may not move. With the combustion plate 100 in a retracted configuration against the side wall as shown in FIG. 13, the container 10 can still be used to contain combustion and use of the combustion can be made by mounting an object on the lower non-vertical segments 150, which now act as the heating platform. Any number of additional mechanisms for providing the present devices with an ability to fix the height of the panels 20A through 20D of the container 10 at a given point along the hinge pins 130 can be utilized.

Referring again to FIG. 1, one or more of the vertical panels 20A through 20D may include fuel openings 170. Such fuel openings 170 are different from mere ventilation openings, such as openings 180, as the fuel openings 170 are useful for the insertion of fuel into the container 10. By contrast, ventilation openings 180 are not of a sufficient size to realistically accomplish insertion of an amount of fuel sufficient to feed and maintain a significant combustion reaction or event. The fuel openings 170 can be labeled or referred to by the panel in which the fuel opening is included. For example, the fuel opening 170 included in panel 20D can be referred to as fuel opening 170D.

The shape and size of the fuel openings 170 may vary greatly depending on the desired operation and effect. As shown in the figures, the fuel openings 170 are oval in shape. However, any other geometric shape may be used as desired including square, rectangle, arcuate, circular, etc. Moreover, the size (e.g., area, profile or shape) of one or more of the fuel openings 170 can be altered as desired. In some aspects, one or more of the fuel openings 170 may have a fully closed perimeter (or profile) within one or more of the panels 20A through 20D and in other embodiments one or more of the fuel openings 170 may have an open perimeter in one or more of the panels 20A through 20D. In this latter embodiment, the fuel opening 170 would extend past an edge of the panel in which it is disposed.

In certain embodiments, one, two, three, or four of the panels 20A through 20D may have a fuel opening (e.g., fuel openings 170). In embodiments where the container 10 includes more than four panels, all or less than all of the panels can have fuel openings (e.g., fuel openings 170). In some embodiments, the fuel openings 170 may be arranged on adjacent panels. For example, the panel 20C includes fuel opening 170C and the panel 20D, which is joined with panel 20C by hinge 30C, includes fuel opening 170D. Although not shown, in other embodiments, the fuel openings may be located on opposite panels (e.g., panel 20D and panel 20B, panel 20A and panel 20C.

The locations of fuel openings can be a different heights within the container 10. For example, regarding the location of the fuel openings 170 on each of the respective panels 20C, 20D, as shown in FIG. 5, the fuel openings 170 may be located at different heights above the bottoms of the respective panels 20C, 20D. As a specific example, a bottom edge 172D of fuel opening 170D can be a different vertical height (or orientation) (within a different horizontal plane) from a bottom (or top) of the panel 20D (or panel 20C) than a vertical height (or orientation) of a bottom edge 172C of fuel opening 170C from a bottom (or top) of the panel 20C (or panel 20D). As another specific example, a top edge 171D of fuel opening 170D can be a different vertical height (within a different horizontal plane) from a bottom (or top) of the panel 20D (or panel 20C) than a top edge 171C of fuel opening 170C is vertically oriented from a bottom (or top) of the panel 20C (or panel 20D). In some implementations, a bottom edge 172D of fuel opening 170D can be vertically disposed above (e.g., above a horizontal plane) or below a top edge 171C of fuel opening 170C.

In other embodiments, fuel openings (e.g., fuel openings 170) (e.g., top edges, bottom edges) may be located at substantially the same height above the bottoms of the panels 20A through 20D within which they are respectively disposed. In some implementations, one or more fuel openings may be aligned vertically along a midpoint or horizontal centerline of one or more of the panels 20A through 20D.

Fuel openings (e.g., the fuel openings 170) may be located at any desired lateral location on the panels 20A through 20D. For example, in FIG. 5, the fuel openings 170C, 170D are centered at a location away from the hinge 30C that joins the panels 20C, 20D. As shown in FIG. 5, fuel opening 170C (e.g., a center or centerline of the fuel opening 170C) is offset from a centerline R1 (e.g., vertical centerline) of the panel 20C in a direction away from hinge 30C, and fuel opening 170D (e.g., a center or centerline of the fuel opening 170D) is offset from a centerline R2 of the panel 20D in a direction away from the same hinge—hinge 30C. Accordingly, an area of the fuel opening 170C a first side (e.g., left side) of the centerline R1 is less than an area of the fuel opening 170C on a second side (e.g., right side) of the centerline R1. Also, an area of the fuel opening 170D a first side (e.g., left side) of the centerline R2 is greater than an area of the fuel opening 170D on a second side (e.g., right side) of the centerline R2.

In other embodiments the fuel openings 170C, 170D they may be located closer to (e.g., offset from the centerlines R1, R2 toward) the hinge 30C adjoining the panels 20C, 20D. Accordingly, the majority of the area of the openings on one or the other side of the centerlines R1, R2 may be different. In some implementations, a first fuel opening may be offset from a centerline of a panel and a second fuel opening may aligned along a centerline of a panel. Although not shown, in some implementations, one or more of the fuel openings can be centered about a centerline of one In yet another embodiment, the location of fuel opening on each panel may be coordinated to work in cooperation with a fuel opening on a different panel. Although not shown, in some embodiments, a single panel may have multiple fuel openings or may exclude a fuel opening and/or a ventilation opening.

In some implementations, a ventilation opening may be on a panel opposite a panel including a fuel opening. For example, as shown in FIG. 3, the fuel opening 170D is in panel 20D, which is opposite (on an opposite of the container 10) from ventilation openings 180B included in panel 20B. Accordingly, the fuel opening 170D faces the ventilation openings 180B (when the container 10 is an open configuration). Similarly, the fuel opening 170C is in panel 20C, which is opposite (on an opposite of the container 10) from ventilation openings 180A included in panel 20A. Accordingly, the fuel opening 170C faces the ventilation openings 180A (when the container 10 is an open configuration). Although not shown, in some implementations, ventilation openings can be on opposite or opposing panels. Also, in some implementations, fuel openings can be included in opposite or opposing panels.

As shown in at least FIG. 3, the ventilation openings and/or the fuel openings can be offset from vertical planes (vertical planes S1 and S2, which divide the container 10 into four quadrants Q1 through Q4 when viewed from above) through a midpoint (e.g., an approximate midpoint) of the container 10. For example, the fuel opening 170D and the ventilation openings 180B are centered at a location that is offset from the vertical plane S2 rather than being centered about the vertical plane S2 (which can be through a center or horizontal midpoint of the planes 20B and 20D). Accordingly a greater number or area (e.g., collective area) of ventilation openings 180B are on a first side of the vertical plane S2 than on a second side of the vertical plane S2, and a greater area of the fuel opening 170D is on the first side of the vertical plan plane S2 than on the second side of the vertical plane S2. Similarly, the fuel opening 170C and the ventilation openings 180A are centered at a location that is offset from the vertical plane S1 rather than being centered about the vertical plane S1 (which can be through a center or horizontal midpoint of the planes 20A and 20C). Accordingly a greater number or area (e.g., collective area) of ventilation openings 180A are on a first side of the vertical plane S1 than on a second side of the vertical plane S1, and a greater area of the fuel opening 170C is on the first side of the vertical plan plane S1 than on the second side of the vertical plane S1. In some implementations, the area (or collective area) associated with the fuel openings and/or ventilation openings can be divided across one or more planes (e.g., plane S1, plane S2).

As shown in at least FIG. 3, the fuel openings 170C, 170D can have a size (or area) that is greater than a size (or area) of each of the ventilation openings 180A, 180B. For example, the fuel opening 170C can have an area that is at least 2 times (e.g., 3 times, 4 times) larger than an area of one of the ventilation openings 180A.

In some implementations, one or more of the fuel openings can have an area that is greater than, equal to, or smaller than a collective area of all of the ventilation openings included in a panel. For example, the fuel opening 170C in panel 20C can have an area that is greater than or equal to a collective area of all of the ventilation openings 180A included in the panel 20A.

Figure 21:
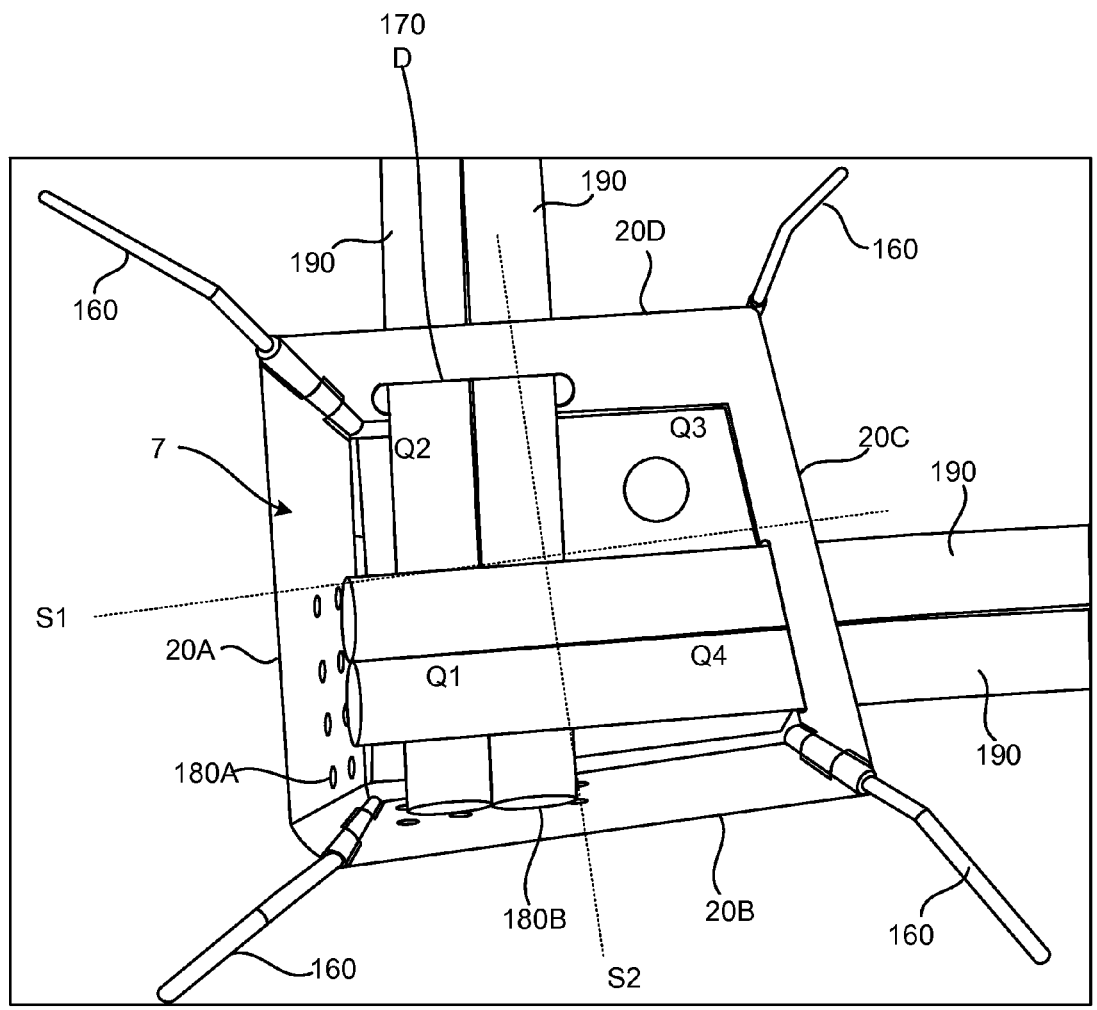
FIG. 21 shows a top view of a combustion container with pieces of fuel inserted into the container through fuel openings and converging at a point in an overlapping or stacked manner in accordance with one embodiment.

Referring now to FIG. 21, the combustion container 10 is shown with pieces of fuel 190 inserted through fuel openings 170 and converging at a desired location within the container 10 (when the container 10 is an open configuration). In this embodiment, the selected convergence point (or intersection) is near a corner or quadrant of the container that includes ventilation openings 180. However, it should be noted that the selected convergence point for the fuel may be at any desired location within the container 10. For example, the container 10 when viewed from above can be divided into quadrants Q1 through Q4 by planes S1 and S2 (as described in connection with FIG. 3). Accordingly, a majority of an overlap or intersection of a projection of an area of the ventilation opening 170C as a volume into the chamber 7 of the container 10 and a projection of an area of the ventilation opening 170D as a volume into the chamber 7 of the container 10 is in quadrant Q1. Also, a majority of the ventilation openings 180A, 180B are also located in the quadrant Q1.

It has been discovered that by converging fuel pieces, a large combustion reaction can be produced. Much larger in fact that a single fuel piece by itself. In the exemplified embodiments, the convergence of the fuel pieces results in a vertical stacking of the fuel where the ends of the fuel pieces 190 overlap one another (e.g., in quadrant Q1). This vertical staking of the fuel allows a greater combustion reaction to take place in a very small space. As such, the overlapping or stacking of fuel pieces provides a significant advantage that aids in minimizing the size of the combustion container 10, while allowing an amount of combustion to occur that is useful, for example, for cooking, heating water, etc.

Figure 22:
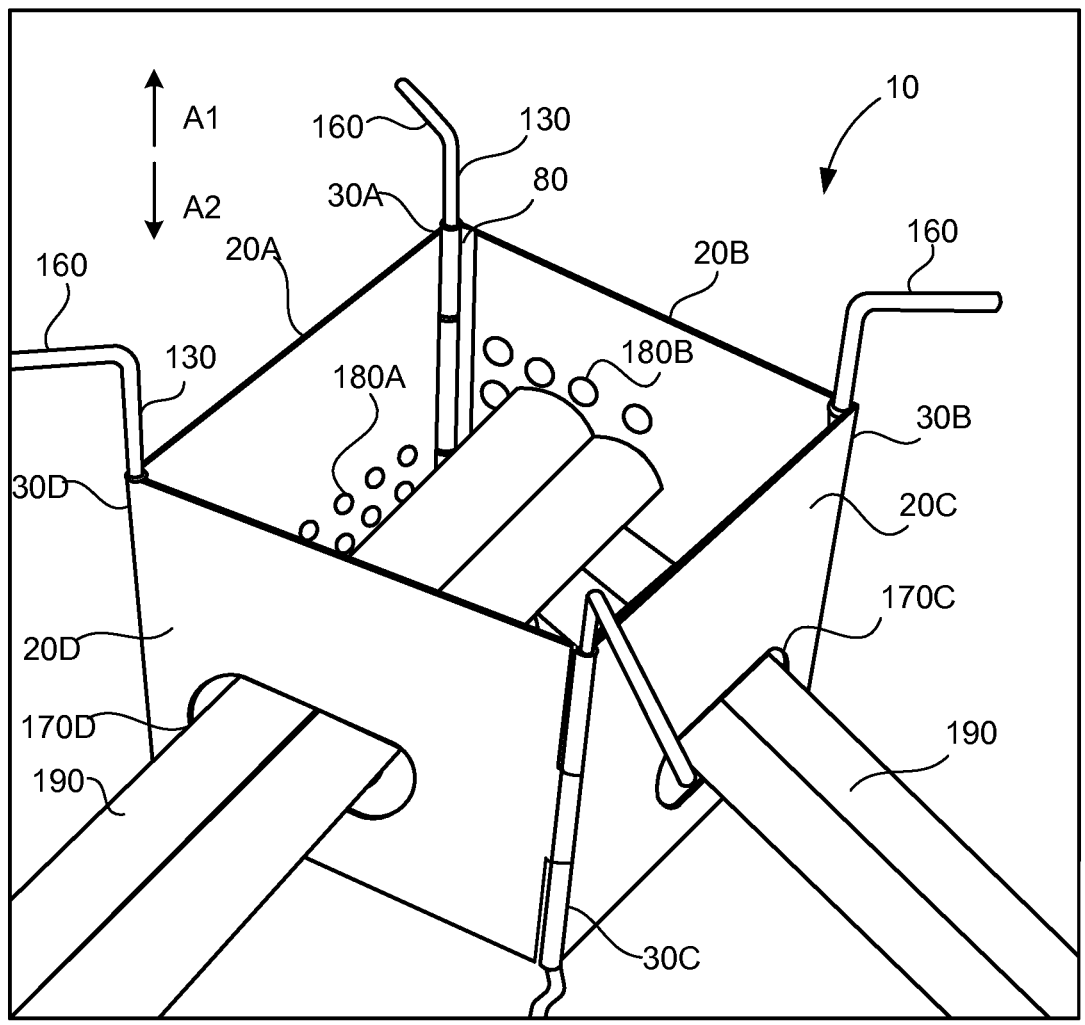
FIG. 22 shows a top perspective view of the device and fuel as arranged in FIG. 21.

Referring again to fuel openings 170, as previously mentioned, such fuel openings can be located at nearly any desired spot on a panel and further fuel openings can be specifically located at spots or locations on each panel (e.g., panels 20A through 20D) that allow the fuel openings to work together or work together more effectively in creating a convergence point for the fuel pieces 190. For example, as shown in FIG. 22, one fuel opening is higher than the other. In other words, one fuel opening is further away from the bottom of its panel than the other opening as described above. This tiered configuration is helpful in achieving the convergence of the fuel pieces in a stacked arrangement. Specifically, the fuel pieces rest on the bottom edge (e.g., bottom edge 172C, bottom edge 172D) of each fuel opening (e.g., fuel opening 170C, 170D) while inserted into the container 10. With the bottom edges of each opening at different heights, the vertically stacked convergence is more easily created and maintained as the top fuel pieces need not rest on the bottom fuel pieces to the same degree that would be required if the fuel openings 170 were at the same height. In some embodiments, the converging ends of the fuel pieces need not rest on or touch one another at all, but are full supported by bottom edge of the fuel openings 170.

Referring again to FIGS. 21 and 22, in operation, some embodiments allow fuel pieces 190 to extend into the container 10 and create the vertical stacked arrangement while a portion of the fuel pieces 190 remain outside of the container 10. In this case, the ends of the fuel pieces 190 in the container 10 may be combusted while the portions outside the container 10 are not combusted. As the fuel pieces 190 within the container 10 are burned, new fuel may be advanced into the container 10 by merely pushing the fuel pieces 190 forward into the container 10 by using the portions outside the container 10. In this way, a combustion or burn event may be sustained for a much longer amount of time as compared to merely using fuel that is placed entirely inside of the container 10 all at once. When such arrangement is used, the bottom edge (e.g., bottom edge 172C, bottom edge 172D) of the fuel openings 170 act as an effective fulcrum for the fuel pieces 190 and having the fuel openings 170 at different heights greatly aids in achieving the overlapping or vertical stacking arrangement desired.

In some embodiments it is possible to have multiple fuel openings 170 on a single panel at different heights. In yet other embodiments, such fuel openings 170 can be coordinated with fuel openings 170 in other panels in order to achieve a specifically desired convergence, or vertical stacked arrangement of the fuel (e.g., fuel pieces 190) inside the container 10.

FIGS. 27A and 27B are diagrams that illustrate support pins 190A, 190B coupled to the container 10 according to an implementation. The support pins 190A, 190B are coupled to the container 10 via openings 15A through 15D (which can be referred to as support pin openings). Specifically, support pin 190A has a first portion disposed within the opening 15B (included in panel 20B) and has a second portion disposed within the opening 15C (included in panel 20C). Support pin 190B has a first portion disposed within the opening 15A (included in panel 20A) and has a second portion disposed within the opening 15D (included in panel 20D).

As shown in FIG. 27A, the support pins 190A, 190B are aligned non-parallel to the panels 20A through 20D when the container is in the open configuration. In this implementation, the support pins 190A, 190B are each aligned diagonally within the box-shaped container 10 when the container is in the open configuration. For example, the support pin 190A is aligned along a line that intersects panel 20B and panel 20C and the container 10 is in an open configuration. In some implementations, the support pin 190A can define an angle of approximately 45° with a plane aligned along one or more of the panels 20A, 20B. in some implementations, the angle can be greater 45° or less than 45°.

FIGS. 27B through 27D are diagrams that illustrate various views of the support pin 190A. As shown in FIGS. 27B through 27D, the support pin 190A includes a retention portion 191A on a first end and includes a retention portion 192A on a second end opposite the first end. The support pin 190A includes a medial portion 193A disposed between the retention portions 191A, 192A. In some implementations, the support pin 190A can be referred to as a hooked pin.

After being inserted through the openings 15A, 15C, the retention portions 191A, 192A can be used to maintain the support pin 190A within the container 10. For example, the retention portion 192A can be inserted into the opening 15C, and the support pin 190A can be moved through the opening 15C until the retention portion 192A can be then inserted into and moved through the opening 15B. In this manner, the retention portion 192A can be disposed outside of the exterior surface 5B of the panel 20B such that the panel 20B is disposed between the retention portion 192A and the medial portion 193A of the support pin 190A. Similarly, the retention portion 191A can be disposed outside of the exterior surface 5C of the panel 20C such that the panel 20C is disposed between the retention portion 191A and the medial portion 193A of the support pin 190A.

In this implementation, the retention portion 192A of the support pin 190A includes an extension portion 195A that extends in a direction that is orthogonal to (or approximately orthogonal to) the medial portion 193A of the support pin 190A. Accordingly, after the support pin 190A has been inserted through the openings 15A, 15B, the extension portion 195A can be aligned based on the orientation of the container 10 and in response to gravity (e.g., in a downward direction along direction A2 for example). The support pin 190B (shown in FIG. 27A) has an orientation with an extension portion (not labeled) that extends in a vertical direction along direction A2.

The retention portion 191A of the support pin 190A includes a hook shape. The hook shape of the retention portion 191A may prevent the retention portion 191A from being inserted into or moved through one or more of the openings 15A, 15B in an undesirable fashion when the support pin 190A is coupled to the container 10.

In this implementation, the features of the retention portion 191A and the features of the retention portion 192A are defined so that the support pin 190A may be entirely disposed within or aligned along two planes. In other words, the retention portion 191A is rotated (or disposed) axially around the medial portion 193A with respect to the retention portion 192A such that the retention portions 191A, 192A of the support pin 190A are disposed within or aligned along different planes. As shown in FIG. 27B, the retention portion 191A is aligned along or disposed within plane M1, which is also aligned along the medial portion 193A between the retention portions 191A, 192A. As shown in FIG. 27C, the retention portion 191A is aligned along or disposed within plane M2, which is orthogonal to plane M1 and which is also aligned along the medial portion 193A between the retention portions 191A, 192A. FIG. 27D, which is viewed from direction N shown in FIG. 27B, illustrates that the retention portion 191A and 192A are orthogonally aligned along planes M2 and M1 respectively. Although not shown, in some implementations, the angle between the retention portion 191A and the retention portion 192A can be non-orthogonal (e.g., an obtuse angle, an acute angle). Accordingly, in some implementations, the retention portion 191A and the retention portion 192A can be aligned along non-orthogonal planes. In some implementations, one or more of the retention portions 191A, 192A may be rotated (or disposed) axially around the medial portion 193A such that one or more features of the support pin 190A may be disposed within or aligned along a single plane.

Figure 28:
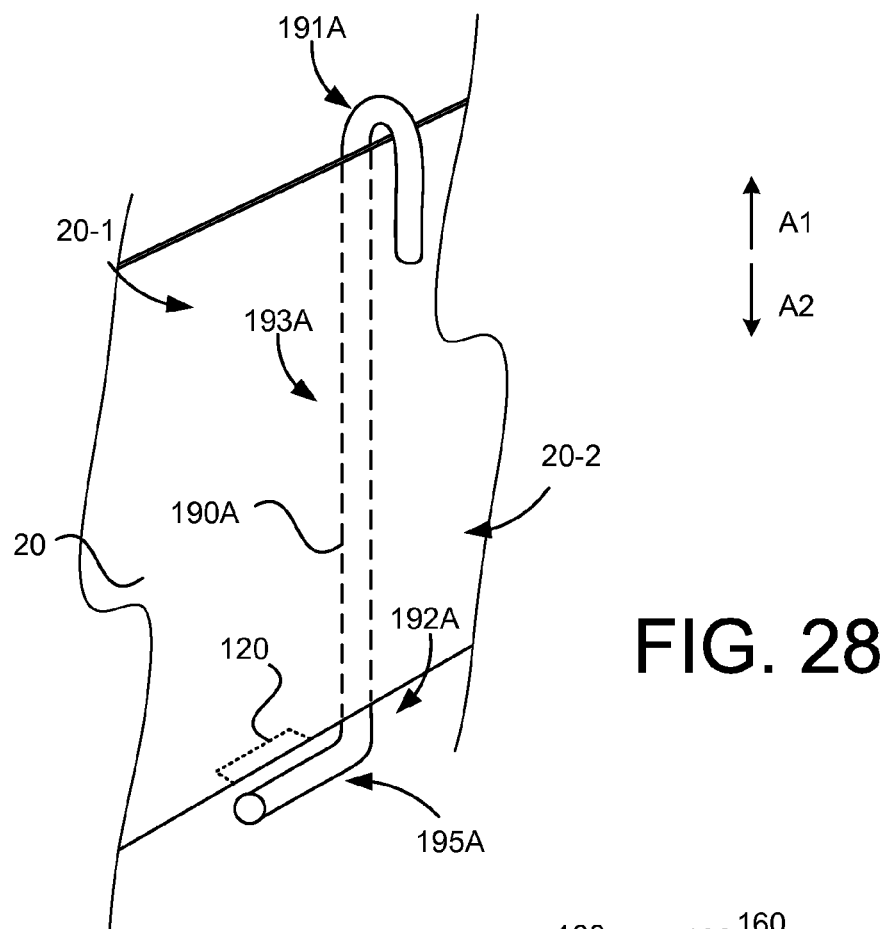
FIG. 28 is a diagram that illustrates coupling of the support pin shown in FIGS. 27A through 27D to a panel.

The shape of the support pin 190A facilitates coupling of the support pin 190A to one or more of the panels 20A through 20D when the support pin 190A is not in use as a support member. For example, as shown in FIG. 28, the support pin 190A can be coupled to a panel 20 (e.g., panel 20C). The retention portion 191A is coupled to a first end portion 20-1 of the panel 20 or disposed around a first edge of the panel 20 such that the panel 20 is disposed between a first portion of the retention portion 191A and a second portion of the retention portion 191A. While the retention portion 191A is coupled to the first end portion 20-1 of the panel 20, the retention portion 192A is disposed on a second end portion 20-2 of the panel 20 (e.g., below a second edge of the second end portion 20-2). Because the retention portions 191A, 192A are orthogonally aligned, the retention portion 191A is disposed around the first end portion of the panel 20-1 and the retention portion 192A is aligned with the panel 20 (aligned along a same plane or parallel to a plane of the panel 20). If the panel 20 includes a tab 120, the tab 120 may engage with or contact the extension portion 195A of the retention portion 192A to prevent undesirable movement along direction A1. The coupling of the retention portion 191A with the panel 20 prevents undesirable (e.g., significant) movement of the retention portion 191A along direction A2.

Figure 29:
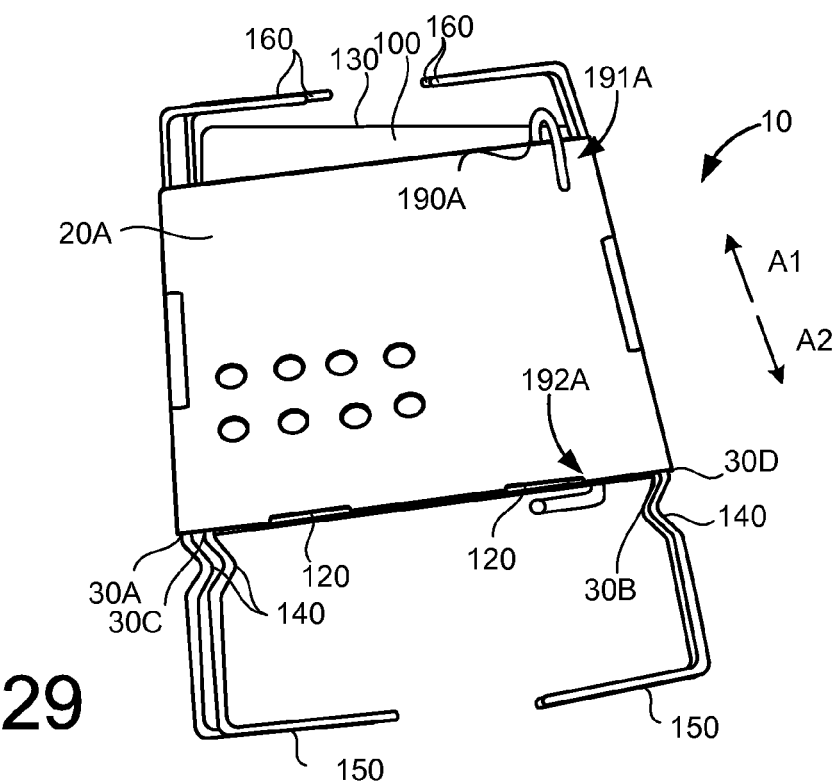
FIG. 29 is a diagram that illustrates coupling of the support pin to the container in a closed configuration.

In some implementations, the shape of the support pin 190A can enable coupled of the support pin 190A to the container 10 when the container is in a closed configuration as shown in FIG. 29. As shown in FIG. 29, the support pin 190A is coupled to the panel 20A. The retention portion 191A of the support pin 190A is coupled to a top end portion of the panel 20A (substantially preventing vertical movement along direction A2) and the retention portion 192A is coupled to a bottom end portion of the panel 20A. The retention portion 192A is disposed adjacent the tab 120 so that the retention portion 192A engages the tab 120 to substantially prevent vertical movement along direction A1. The support pin 190A is disposed between at least two of the panels in the closed configuration of the container 10. In some implementations, multiple support pins may be coupled to the container 10 when the container 10 is in the closed configuration.

In some implementations, the retention portions 191A, 192A can have different shapes than shown in FIG. 27B. One or more of the retention portions 191A, 192A can have a shape that enabled movement of the one or more of the retention portions 191A, 192A through one or more of the openings 15B, 15C. In some implementations, the retention portion 191A can have a same shape as the retention portion 192A. In some implementations, the support pin 190A can have a same shape or a different shape as the support pin 190B.

The support pins 190A, 190B, when coupled to the container 10, may not only provide structural rigidity for the container 10, but can also be used to support a variety of accessories including a burner (e.g., a Trangia burner, a butane burner), a grill plate, and/or so forth. At least a portion of an accessory may be disposed between or disposed on (e.g., disposed on top of) one or more of the support pins 190A, 190B. For example, in the case of a burner, at least a first portion of the burner may be disposed between the support pins 190A, 190B, and a second portion of the burner may be disposed on top of one or more of the support pins 190A, 190B. In some implementations, the burner may have one or more clips configured to be coupled to one or more of the support pins 190A, 190B. In some implementations, portions of the accessories, such as a hose of a burner, may be moved through one or more of the ventilation openings 180 and/or the fuel openings 170. An example of a grill plate accessory that can be supported by the support pins 190A, 190B is shown in FIG. 30.

Figure 30:
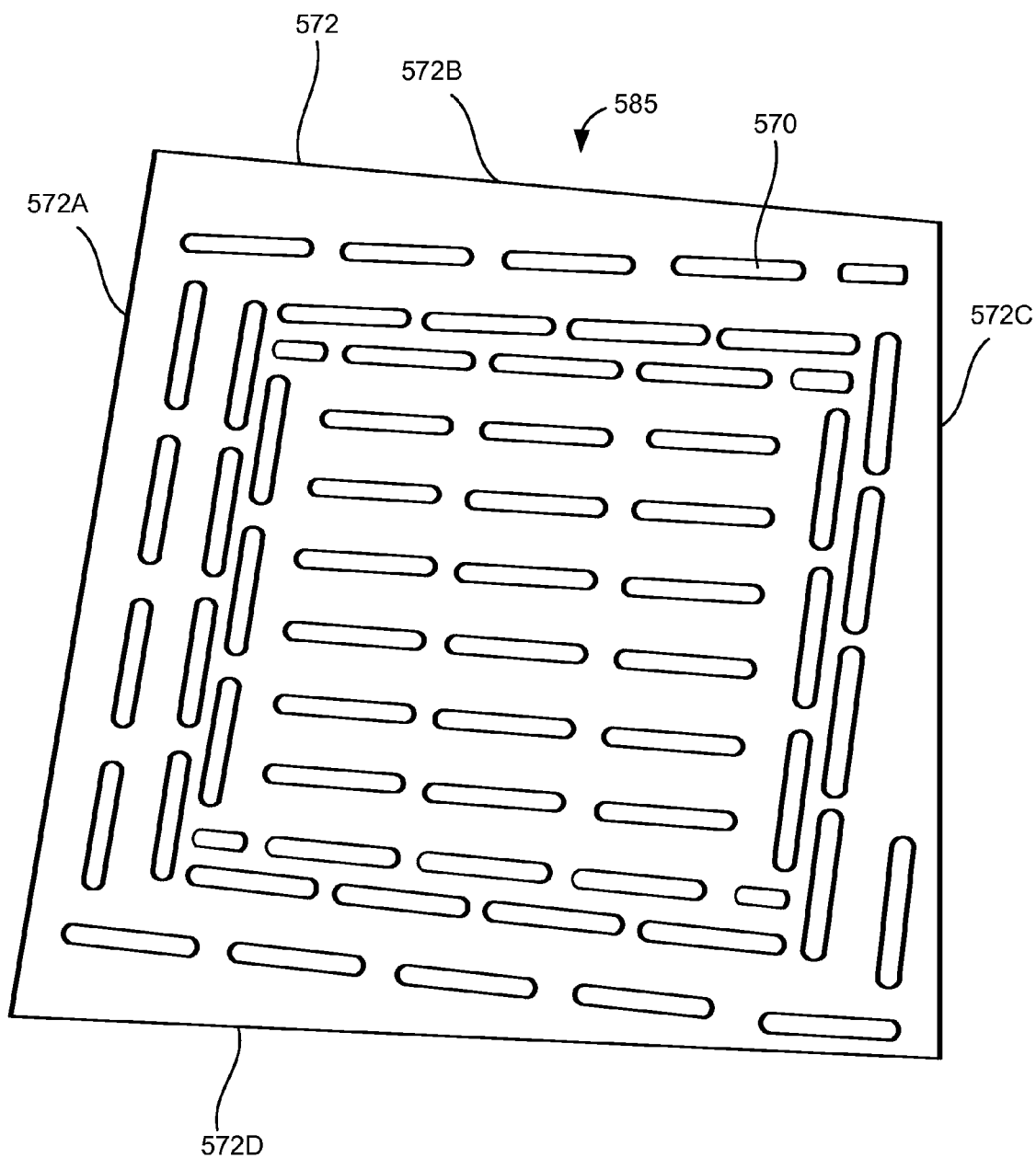
FIG. 30 illustrates a grill plate according to an implementation.

FIG. 30 illustrates a grill plate 585 according to an implementation. As shown in FIG. 30, the grill plate 585 includes several openings 570. In some implementations, the openings 570 can have a slot shape as shown in FIG. 30. In some implementations, the openings 570 can have a different shape such as an oval shape, a square shape, a circular shape, a curved shape, a stair like profile, and/or so forth. Also, as shown in FIG. 30, the openings 570 are aligned along a variety of directions and are separated by a variety of widths. In this implementation, at least some of the openings 570 are aligned parallel to at least one of the edges (e.g., edge 572A, 572B, 572C, 572D) of the grill plate 585 and at least some of the openings 570 are aligned non-parallel to at least one of the edges.

In some implementations, the grill plate 585, which can be a surface upon which, for example, a food item, can be cooked, can instead function as a fire grate upon which a combustible fuel may be disposed and combusted. Such an embodiment is described in connection with at least FIG. 36.

In some implementations, the openings 570 can have a uniform length, a uniform width, a uniform orientation, a uniform separation, and/or so forth. In some implementations, the openings 570 can have a non-uniform length, a non-uniform width, a non-uniform orientation, a non-uniform separation, and/or so forth.

As shown in FIG. 30, the grill plate 585 has a non-square outer perimeter 572 or profile. At least one corner of the grill plate 585 can define a right angle. In this implementation, at least two of the corners of the grill plate 585 define an obtuse or acute angle. In some implementations, a grill plate can have a square profile or outer perimeter 572.

Referring back to FIG. 27A, although a pair of support pins 190A, 190B is illustrated in FIG. 27A. In some implementations, more or less than two support pins 190A, 190B may be coupled to the container 10. In some implementations, a support pin (e.g., support pin 190A) may be coupled via a combination of different openings. For example, a support pin may be coupled to the container 10 via a combination of openings 15A and 15B (which are included in adjacent panels 20A and 20B), or openings 15A and 15C (which are on opposing sides in opposite panels 20A and 20C) rather than openings 15B and 15C.

Although not shown in FIG. 27A, in some implementations, more support openings than shown (more than openings 15A through 15D) can be included in one or more of the panels 20A through 20D. Accordingly, a support pin (e.g., support pin 190A, 190B) may be optionally coupled to the container 10 at various vertical heights or depths. Also, the support pin may be optionally coupled to the container 10 at various lateral locations and/or angles with respect to the panels 20A through 20D to accommodate a variety of accessories (including those described above).

Referring back to FIG. 6, in some implementations, when a combustion reaction is occurring in the chamber 7, a gas (e.g., air, wind) moving in a lateral direction (e.g., direction Z) can decrease the effectiveness of heat transfer from the chamber 7 to an object disposed on the heating platform defined by the non-vertical segments 160. This can be a particular issue in the area 9 shown with a dashed line. This region is defined by an upper edge of one or more of the panels 20A through 20D and a bottom surface of a heating platform defined by the non-vertical segments 160. Accordingly, a blocking plate can be disposed in this area to block adverse conditions to heating. An example of a blocking plate and use of a blocking plate are described in connection with at least FIGS. 31 and 32.

Figure 31:
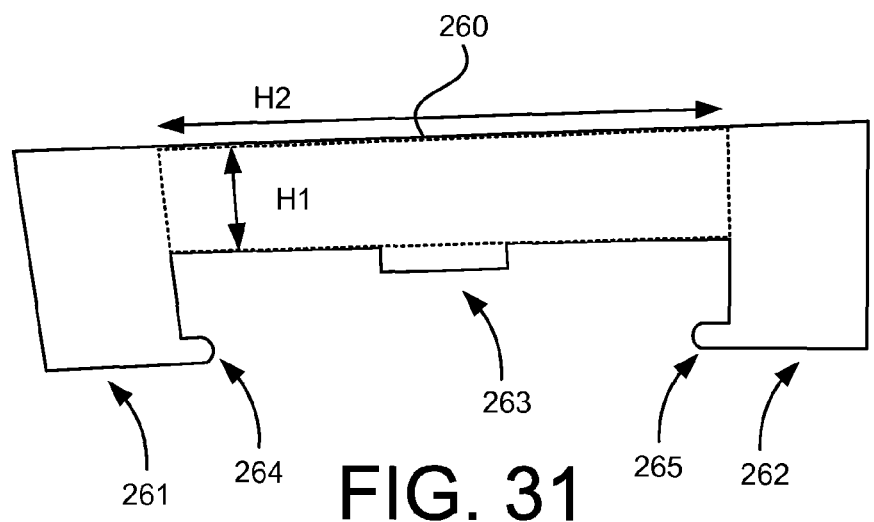
FIG. 31 is a diagram that illustrates a perspective view of a blocking plate according to an implementation.

FIG. 31 is a diagram that illustrates a perspective view of a blocking plate 260 according to an implementation. As shown in FIG. 31, blocking plate 260 includes extensions 261, 262 and coupling mechanisms 263 through 265. The extensions 261, 262 can be used in conjunction with the coupling mechanisms 263 through 265 to couple the blocking plate 260 to the container 10.

The blocking plate 260 shown in FIG. 31 includes a blocking region 26. In some implementations, a height H1 of the blocking region 26 can be approximately equal to a height between a heating platform defined by non-vertical segments 160 (e.g., shown in FIG. 6) and a top edge of one or more of the panels 20A through 20D. In some implementations, the height H1 can be greater than or less than the height between a heating platform defined by non-vertical segments 160 (e.g., shown in FIG. 6) and a top edge of one or more of the panels 20A through 20D.

A width H2 of the blocking region 26 can be approximately equal to a width of one or more of the panels 20A through 20D. In this implementation, an overall width of the blocking plate 260 is greater than a width of the blocking region 26 and is greater than a width of one or more of the panels 20A through 20D. In some implementations, the width H2 of the blocking region 26 can be less than or greater than a width of one or more of the panels 20A through 20D.

Figure 32:
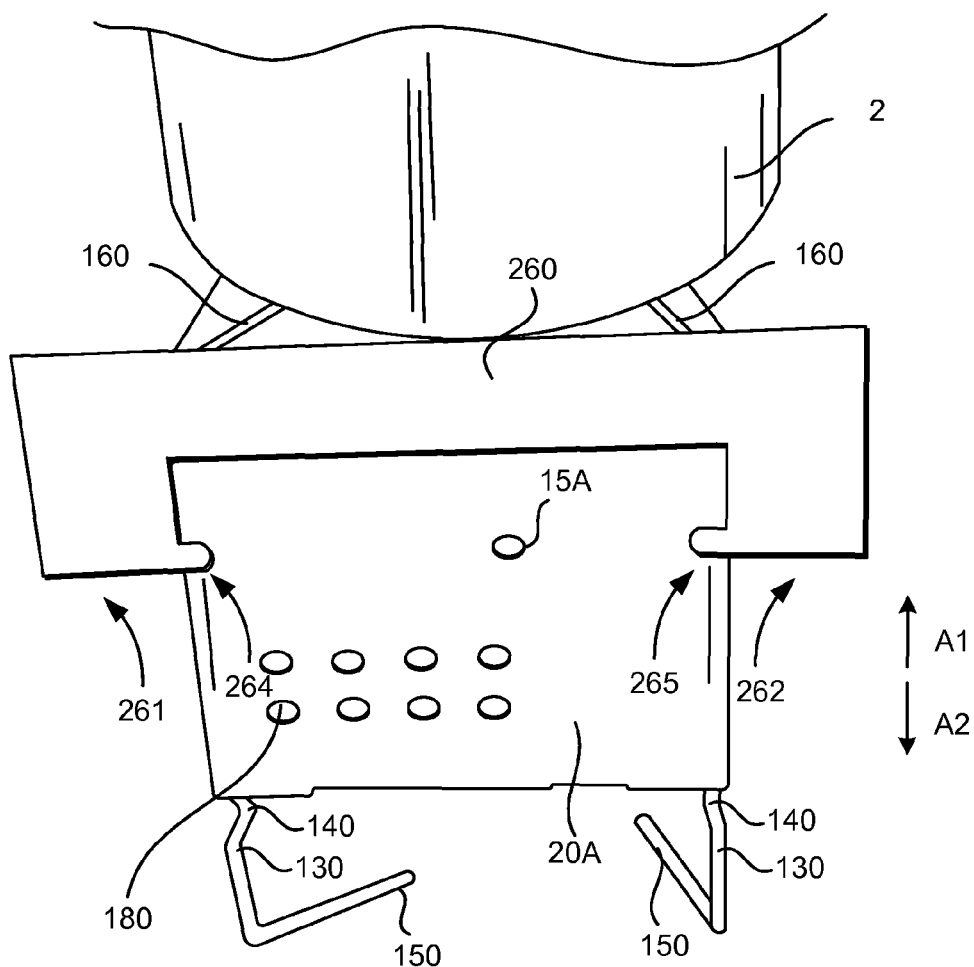
FIG. 32 is a perspective view that illustrates the blocking plate shown in FIG. 31 coupled to a container.

FIG. 32 is a perspective view that illustrates the blocking plate 260 shown in FIG. 31 coupled to a container 10. In this illustration, a pot 2 is disposed on a heating platform defined by the non-vertical segments 160. As shown in FIG. 32, the coupling mechanisms 264 and 265 are disposed on a first side (an exterior side) of the panel 20A and the coupling mechanism 263 (not shown) is disposed on a second side (and interior side) of the panel 20A. Accordingly, the panel 20A is disposed between a first coupling mechanism and a second coupling mechanism.

Although the coupling mechanisms 263 through 265 are shown in FIGS. 31 and 32 as tabs (or protrusions), in some implementations, a different coupling mechanism can be included in a blocking plate. For example, one or more coupling mechanisms included in a blocking plate (e.g., blocking plate 260) can be, or can include, a clip, a pin, a pressfit mechanism, a screw, a spring, and/or so forth. In some implementations, a blocking plate can include more or less than three coupling mechanisms as shown in FIGS. 31 and 32. Any of the features (e.g., accessories, blocking plate, embodiments) described above in connection with at least FIGS. 1 through 32 can be applied to additional containers such as the containers described below in connection with FIGS. 33A through 36.

FIG. 33A is a diagram that illustrates another container 2000 including panels 520 joined by hinges 530 (similar to the panels 20A through 20D and hinges 30A through 30D described above). At least one of the panels 520 includes a relief space feature 580 (similar to relief space feature 80 described above). The container 2000 can include any of the features described in connection with the container 10 shown in FIGS. 1 through 32.

As shown in FIG. 33A, a plate 540 is coupled to a bottom portion of the container 2000. In some implementations, the plate 540 can function as an ash tray. The plate 140 may be used to collect ashes or other debris falling from a combustion plate (not shown). Generally the plate 540 is a solid sheet of material that is combustion proof or fire proof, such as the metal material of the rest of the container 2000. In some aspects the plate 540 is substantially flat, and may in some embodiments have upwardly curling edges on one or more opposing ends thereof. Such end(s) may facilitate or ease the ability of a user to grasp the plate 540 when placed on the ground or other flat surface. Additionally, as shown in FIG. 33A, in some embodiments, the plate 540 may have a handle or other features which allow its handling when hot.

In some embodiments, the plate 540 may fit between opposing panels 520 of the container 2000. In some embodiments, the shape of the plate 540 may be tapered at one end in order to accommodate a tapered trapezoidal or trapezium shape of the opening of the container 2000 in view of the fact that a first opposing pair (on opposite sides of the container 2000) of the panels 520 (between which the plate 540 may be inserted) may be non-parallel or more narrow than a second opposing pairs of the panels 520. In some aspects, one or more of the panels 520 may have a mechanism 545 (e.g., a lip, a ledge, a slot, a dimple, a protrusion, a tab, or other feature) for engaging the plate 540 and holding it up above a bottom surface (or edge of a panel 540) of the combustion container 2000 and/or a surface upon which the combustion container 2000 may rest when in use.

As shown in FIG. 33B, the plate 540 may be inserted into the container 2000 in a position above one or more dimples 543 included in the container 2000. The dimples 543 (which can be referred to as support features) can define a protrusion disposed within the container 2000 so that the protrusion may help to support the plate 540. A portion 541 of the plate 540 disposed within the container 2000 above the dimples 543 is illustrated with a dashed line. In this implementations, the plate 540 is further optionally supported by support pins 590A, 590B inserted, respectively, into (e.g., disposed within) the opening 547 and the slot 548 (each of which may be optionally included in one or more of the panels 520). In some implementations, features other than dimples 543 such as a tab, can be included in one or more of the panels 520. Other additional slots, openings, etc. can be defined within one or more of the panels 520 for insertion of support pins. A perspective view of the support pin 590A is illustrated in FIG. 34. A support pin can have a different shape or size than shown in FIG. 34.

In some implementations, multiple plates can be included in the container 2000. For example, a first plate can be included in the container 2000 in the vertical position shown in FIG. 33A and a second plate can be included in the container 2000 in the vertical position shown in FIG. 33B.

Figure 33C:
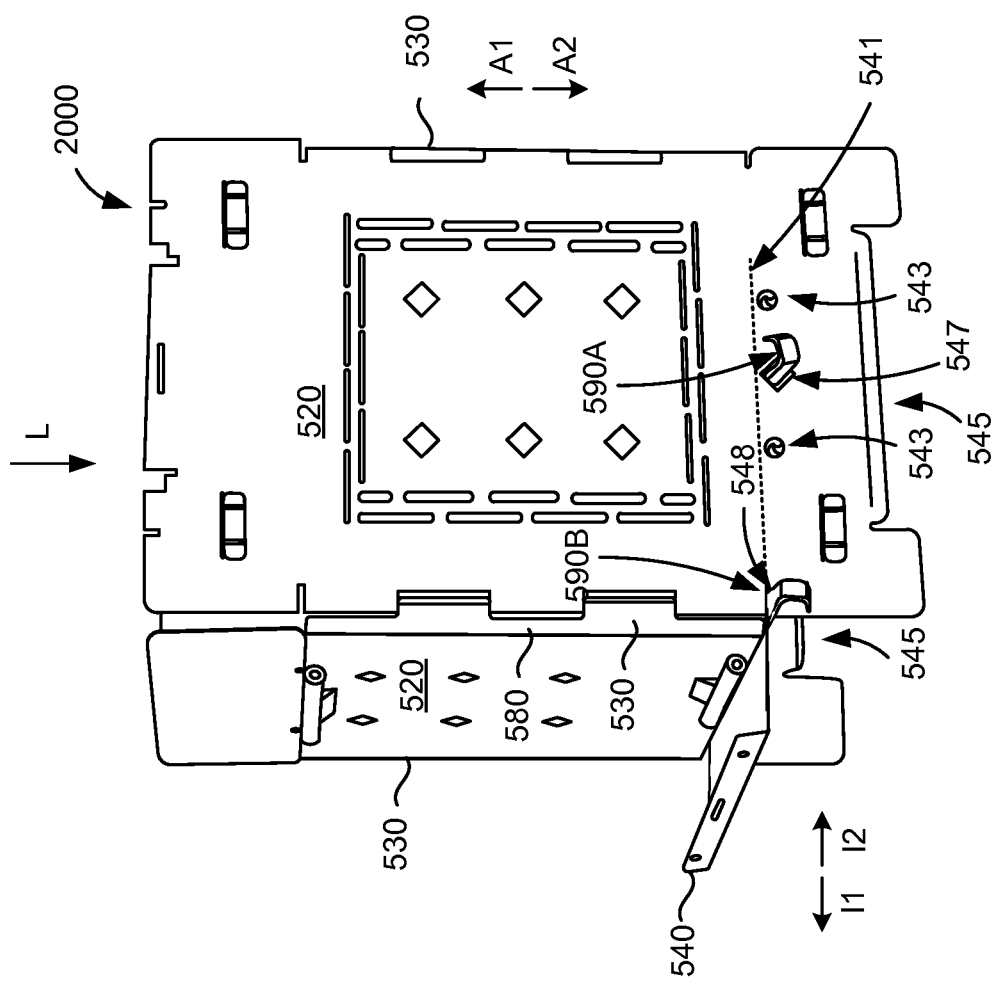

As shown in FIG. 33C, at least a portion of the plate 540 can be slidably moved into (lateral or horizontal direction I2) and out (lateral or horizontal direction I1) of the container 2000. For example, the plate 540 can be slidably moved along direction I1 and/or along direction I2 when in the vertical position shown in FIG. 33B or 33C, or when in the vertical position shown in FIG. 33A. When the plate 540 is in the lateral position shown in FIG. 33B, the plate 540 can be referred to as being in a closed position, and when the plate 540 is in the lateral position shown in FIG. 33C, the plate 540 can be referred to as being in an open position or in a partially open position. Because the plate 540 (as shown in FIG. 33B or 33C can be in contact with or relatively close to a combustion plate included in the container 2000, the plate 540 can function as a damper. This is described in more detail in connection with FIG. 35.

Figure 35:
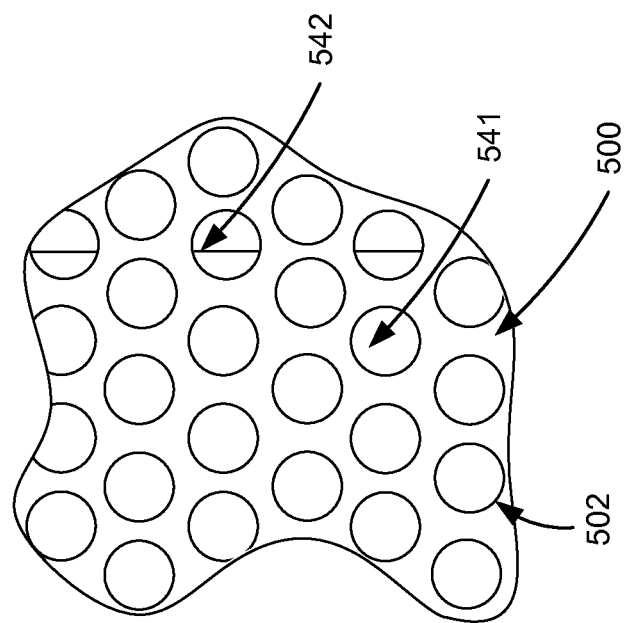
FIG. 35 is a diagram that illustrates a combustion plate with openings.

FIG. 35 is a diagram that illustrates a combustion plate 500 with openings 502 as viewed from direction N shown in FIG. 33C. The plate 540 is disposed below the combustion plate 500. The portion 541 of the plate 540 can be seen through at least a portion of the openings 502. In this implementations, an edge 542 (e.g., front edge) of the plate 540, which is in a partially open configuration, can be seen through at least some of the openings 502 of the combustion plate 500.

Figure 36:
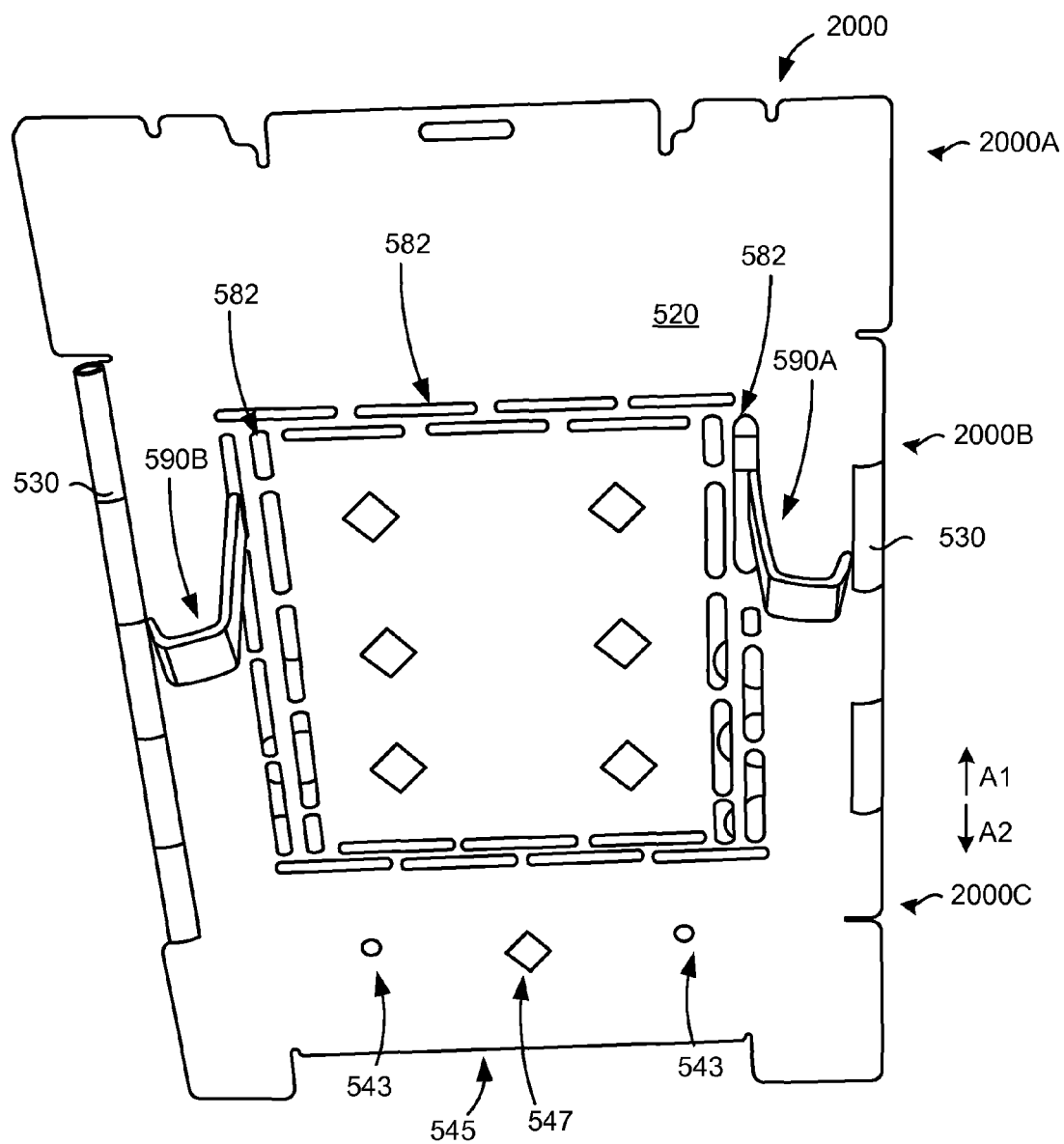
FIG. 36 is a diagram that illustrates a view of the container shown in FIGS. 33A through 33C.

FIG. 36 is a diagram that illustrates a front view of the container 2000 shown in FIGS. 33A through 33C. As shown in FIG. 36, the support pins 590A, 590B can be disposed within openings 582 in the panel 520. The openings 582 can define slots or slits. In some implementations, the openings 582 can be a different shape (e.g., circular shape, a square shape, an oval shape, a curved shape, etc.) than shown in FIG. 36. The support pins 590A, 590B can be configured to support a variety of accessories such as those described above in connection with at least FIGS. 27A through 30. Such as a burner, a grill plate, a fire grate, and/or so forth. Because at least some of the openings 582 have different orientations (e.g., different vertical heights, lateral positions, widths, alignments (e.g., vertical alignments, horizontal alignments), accessories can be disposed within the container 2000 in a variety of orientations (horizontal orientation, non-horizontal orientation). In some implementations, the openings 582 can function as expansion openings that allow for mechanical expansion of materials (of the panel 520) in response to heat within the container 2000. Any of the features described above in connection with at least FIGS. 33A through 36 can be applied to additional containers such as the container 10 described above in connection with FIGS. 1 through 32.

As shown in FIG. 36, a grill plate (not shown) may be disposed on (or within) a top portion 2000A (e.g., along a top edge of the panels) of the container 2000. A combustion plate (e.g., combustion plate 500 shown in FIG. 35) (not shown in FIG. 36) may be disposed on (or within) a bottom portion 2000C of the container 2000. A fire grate (e.g., the grill plate 585 shown in FIG. 30), upon which a fuel may be combusted, may be vertically disposed within portion 2000B (e.g., a medial portion) between the grill plate and the combustion plate. The fire grate may be supported within the container 2000 by one or more of the support pins 590A, 590B. Accordingly, a distance (e.g., a vertical distance) between the fire grate and the grill plate (which is disposed above the fire grate) may be adjusted, and a distance (e.g., a vertical distance) between the fire grate and the combustion plate (which is disposed below the fire grate) may be adjusted. Thus, a distance between the fire plate (and a combusting fuel thereon) and the grill plate may be adjusted. Also, a distance between the fire plate (and a combusting fuel thereon) and the combustion plate (e.g., combustion plate 500) and/or between the fire plate and a damper system including the plate 540 (which may be optionally included) and the combustion plate 500 may be adjusted.

The combustion container 10 and its various parts may be made from a variety of materials which can withstand the exposure to heat produced by the combustion process. Metals, such as iron, steel, stainless steel, aluminum, bronze, tin, and the like, as well as alloys thereof may be used.

The singular forms "a," "an," and, "the" include plural referents unless the context clearly dictates otherwise. Thus, for example, reference to "an edge" includes reference to one or more of such edges, and reference to "the hinge" includes reference to one or more of such hinges.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" holes would either completely lack holes, or so nearly completely lack holes that the effect would be the same as if it completely lacked holes. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

The following exemplary embodiments are provided to illustrate various features and advantages, but not to provide limitations thereon. Each of the various features described below can be included in any combination except for mutually exclusive combinations.

In one example, the collapsible combustion container includes a plurality of vertically oriented panels joined by hinges, a plurality of hinge pings engaged in a plurality of said hinges, said hinge pins configured to form at least part of a base that supports the container or at least part of a heating platform above the container or both, and fuel openings in at least two of the vertically oriented panels, said fuel openings configured to facilitate control of a combustion point within the container at a location where fuel inserted through one opening contacts fuel inserted from another opening.

In one example, the hinge pins are configured to form at least part of a base that supports the container. In one example, the hinge pins include a non-vertical segment below the container. In one example, the non-vertical segment maintains the container at a pre-determined height above a surface on which the base rests. In one example, the non-vertical segment provides a protrusion on which the container can rest.

In one example, the non-vertical segment includes a portion running substantially parallel to a bottom of the container. In one example, the non-vertical segment is a bend in the hinge pin of about 90 degrees. In one example, the hinge pins are configured to form at least a part of a heating platform above the container.

In one example, the hinge pins include a non-vertical segment above a top of the container. In one example, the non-vertical segment is a bend in the hinge pin of about 90 degrees. In one example, the hinge pins are a single piece having both a non-vertical segment below the container and a non-vertical segment above the container. In one example, the non-vertical segments are each a bend in the hinge pin of about 90 degrees. In one example, the non-vertical segments extend in the same direction as one another.

In one example, the non-vertical segments extend in different directions from one another. In one example, the hinge pin can freely rotate within the hinge and an orientation of one end of the hinge pin can be controlled by actuation of the other end of the hinge pin.

In one example, the base and the heating platform can be expanded or reduced simultaneously by actuation of one end of the hinge pins. In one example, every hinge includes a hinge pin. In one example, less than every hinge includes a hinge pin. In one example, each hinge pin is uniformly shaped. In one example, all hinge pins are not uniformly shaped. In one example, the fuel openings are placed at locations in the panels that allow fuel inserted through each opening to converge at a desired location for combustion within the container.

In one example, fuel openings are located in adjacent vertical panels. In one example, all panels include a fuel opening. In one example, at least two panels, but less than all panels includes a fuel opening. In one example, the fuel openings are located in opposite vertical panels. In one example, the fuel openings have a fully closed perimeter in the panels. In one example, the fuel openings have an open perimeter in the panels. In one example, the fuel openings are located at substantially corresponding locations in the panels.

In one example, the fuel openings are located at substantially the same height. In one example, the fuel openings are located at substantially different heights. In one example, the fuel openings have substantially the same shape and/or size in each panel. In one example, the fuel openings have substantially different shapes and/or sizes in each panel. In one example, the fuel opening of one panel is sufficiently higher than the fuel opening of another panel to allow convenient overlap of fuel at a point where it converges inside the container.

In one example, the fuel rests on a bottom edge of each opening. In one example, the fuel is not required to rest on another piece of fuel at a point where it converges inside the container. In one example, combustion is intensified at the location where fuel from one opening converges with fuel from another opening. In one example, a bottom panel is joined to one of the vertical panels, said bottom panel being capable of folding into a vertical orientation upon collapse of the container, and into a horizontal orientation upon opening of said container.

In one example, a method of controlling a size of a base and/or a heating platform of a collapsible combustion container may include providing a container as recited herein, and actuating an end of hinge pins in the container in a manner selected to either expand or reduce a size of a base or a heating platform, or both. In one example, adjustment of both the base and heating platform occur simultaneously upon actuating one end of said hinge pins.

In one example, a method of controlling a location of combustion inside a combustion container can include providing a container as recited herein, and inserting fuel pieces through fuel openings in the container such that the fuel pieces from each opening converge at a location within the container that is the desired combustion location.

Of course, it is to be understood that the above-described arrangements are only illustrative of the application of the principles. Numerous modifications and alternative arrangements may be devised by those skilled in the art without departing from the spirit and scope and the appended claims are intended to cover such modifications and arrangements. Thus, while the implementations have been described above with particularity and detail in connection with what is presently deemed to be the most practical and preferred embodiments, numerous modifications, including, but not limited to, variations in size, materials, shape, form, function and manner of operation, assembly and use may be made without departing from the principles and concepts set forth herein.

What is claimed is:

1. A container, comprising:
   a first panel and a second panel each being vertically oriented and coupled by a first hinge;
   a third panel coupled to the second panel via a second hinge, the third panel including a plurality of ventilation openings;
   a fourth panel coupled to the third panel via a third hinge and coupled to the first panel via a fourth hinge;
   a hinge pin included in the first hinge, the hinge pin configured to at least define part of a base configured to support the first panel or define at least part of a heating platform disposed above the first panel;
   a fuel opening included in the first panel and facing the plurality of ventilation openings included in the third panel, the fuel opening having an area larger than an area of each of the plurality of ventilation openings; and
   a combustion plate aligned along a plane perpendicular to a plane along which the first panel is aligned when the container is in a deployed configuration, the fuel opening and the plurality of ventilation openings being disposed above the combustion plate when the container is in the deployed configuration.

2. The container of claim 1, wherein the base is defined by a first non-vertical segment of the hinge pin, and the heating platform is defined by a second non-vertical segment of the hinge pin.

3. The container of claim 2, wherein the first non-vertical segment and the second non-vertical segment are aligned within a plane.

4. The container of claim 2, wherein the first non-vertical segment is aligned within a plane different than a plane along which the second non-vertical segment is aligned.

5. The container of claim 2, wherein at least one of the first non-vertical segment or the second non-vertical segment is aligned substantially parallel to a bottom of the container.

6. The container of claim 1, wherein the hinge pin includes at least one of a protrusion, a knob, or a bump on which at least one of the first panel or the second panel rests.

7. The container of claim 6, wherein the at least one of the protrusion, the knob, or the bump maintains the at least one of the first panel or the second panel at a pre-determined height above the base.

8. The container of claim 2, wherein at least one of the first non-vertical segment or the second non-vertical segment includes a bend in the hinge pin of about 90 degrees.

9. The container of claim 1, wherein the hinge pin is configured to rotate within the first hinge and an orientation of first end of the hinge pin can be controlled by moving a second end of the hinge pin.

10. The container of claim 1, wherein the base and the heating platform each have an area defined by a perimeter that can be expanded or reduced simultaneously by moving an end of the hinge pin.

11. The container of claim 1, wherein the fuel opening is a first fuel opening, the plurality of ventilation openings have a first portion in the third panel and have a second portion in the fourth panel,
the container further comprising:
a second fuel opening included in the second panel coupled to the first panel, the first fuel opening has a vertical orientation within the first panel different than a vertical orientation of the second fuel opening within the second panel.

12. The container of claim 11, wherein the first portion of the plurality of ventilation openings have a vertical orientation within the third panel different than a vertical orientation of the second portion of the plurality of ventilation openings within the fourth panel.

13. The container of claim 1, wherein the fuel opening is centered at a location offset from a vertical plane through a midpoint of the first panel.

14. An apparatus, comprising:
a first panel being vertically oriented;
a second panel;
a hinge pin having a portion disposed in a portion of the first panel and a portion of the second panel to define a first hinge,
the hinge pin including a platform segment and a support segment, the platform segment being aligned non-parallel to the portion of the hinge pin disposed in the portion of the first panel and the portion of the second panel via a first bend,
the support segment being aligned non-parallel to the portion of the hinge pin disposed in the portion of the first panel and the portion of the second panel via a second bend, and
the hinge pin including a third bend disposed between the first bend and second bend,
a third panel coupled to the second panel via a second hinge; and
a fourth panel coupled to the third panel via a third hinge and coupled to the first panel via a fourth hinge;
a fuel opening included in the first panel and facing a ventilation opening included in the third panel, the ventilation opening having an area smaller than an area of the fuel opening; and
a combustion plate coupled via a hinge, the fuel opening and the ventilation opening being disposed above the hinge of the combustion plate when the apparatus is in a deployed configuration.

15. The apparatus of claim 14, wherein the hinge pin includes a base segment aligned non-parallel to the portion of the hinge pin disposed in the portion of the first panel and the portion of the second panel.

16. The apparatus of claim 15, wherein the support segment, the base segment, and the portion of the hinge pin are aligned within a single plane.

17. The apparatus of claim 14, wherein the portion of the hinge pin disposed in the portion of the first panel and the portion of the second panel is a vertical segment.

18. The apparatus of claim 14, wherein at least one of the first panel or the second panel includes a relief space feature.

* * * * *